US011587162B2

(12) United States Patent
Yan

(10) Patent No.: US 11,587,162 B2
(45) Date of Patent: Feb. 21, 2023

(54) BLOCKCHAIN-BASED DIGITAL LOAN NETWORK

(71) Applicant: TraDove, Inc., Palo Alto, CA (US)

(72) Inventor: Jun Yan, Palo Alto, CA (US)

(73) Assignee: TraDove, Inc., Palo Alto, CA (US)

( * ) Notice: Subject to any disclaimer, the term of this patent is extended or adjusted under 35 U.S.C. 154(b) by 0 days.

(21) Appl. No.: 17/153,732

(22) Filed: Jan. 20, 2021

(65) Prior Publication Data

US 2022/0207605 A1    Jun. 30, 2022

Related U.S. Application Data

(60) Provisional application No. 63/133,098, filed on Dec. 31, 2020.

(51) Int. Cl.
*G06Q 40/02* (2012.01)
*G06Q 20/36* (2012.01)
*G06Q 20/06* (2012.01)

(52) U.S. Cl.
CPC ....... *G06Q 40/025* (2013.01); *G06Q 20/0658* (2013.01); *G06Q 20/3672* (2013.01); *G06Q 20/3678* (2013.01)

(58) Field of Classification Search
CPC .......... G06Q 40/00–025; G06Q 20/065–0658; G06Q 20/367–3678
See application file for complete search history.

(56) References Cited

U.S. PATENT DOCUMENTS

| 10,762,478 B1 | 9/2020 | Maeng | |
|---|---|---|---|
| 2015/0081567 A1* | 3/2015 | Boyle | G06Q 20/405 |
| | | | 705/44 |

(Continued)

FOREIGN PATENT DOCUMENTS

| KR | 20200094061 A | * | 8/2020 | ............. G06Q 20/36 |
|---|---|---|---|---|
| WO | WO2016/076807 | * | 5/2016 | ............. G06Q 20/04 |

OTHER PUBLICATIONS

Fan, Alan, "Stablecoin Lending: A Lucrative High-Yield Opportunity for Debt Investors", Aug. 10, 2019. (Year: 2019).*

(Continued)

*Primary Examiner* — Eric T Wong
(74) *Attorney, Agent, or Firm* — Sheppard Mullin Richter & Hampton LLP

(57) ABSTRACT

Systems and methods are provided for minting payment loan tokens to conduct digital loan transactions within a blockchain-based digital loan payment network. The payment loan tokens are pegged to fiat currency or digital currency. The computing system is a node in the blockchain-based digital loan payment network. A number of payment loan tokens to be provided to a borrower can be determined based on a digital loan transaction. The borrower is a network participant associated with the blockchain-based digital loan payment network. The number of payment loan tokens can be provided for deposit in a digital wallet associated with the borrower based on the digital loan transaction. Payees that receive payment loan tokens from the borrower can redeem the payment loan tokens as fiat or digital currency. A data record that represents the digital loan transaction can be generated. The data record is posted to a blockchain associated with the blockchain-based digital loan payment network.

29 Claims, 14 Drawing Sheets

(56) References Cited

U.S. PATENT DOCUMENTS

| | | | | |
|---|---|---|---|---|
| 2019/0318346 | A1* | 10/2019 | Ben-David | H04L 9/14 |
| 2020/0286170 | A1* | 9/2020 | Kramer | G06Q 20/381 |
| 2020/0327609 | A1* | 10/2020 | Dubrofsky | G06Q 40/06 |
| 2021/0042823 | A1* | 2/2021 | McClelland | G06Q 40/04 |
| 2021/0065293 | A1* | 3/2021 | Sigler | G06Q 20/102 |
| 2021/0073913 | A1* | 3/2021 | Ingargiola | G06Q 40/12 |
| 2021/0082044 | A1* | 3/2021 | Sliwka | H04L 9/3239 |

OTHER PUBLICATIONS

"Benefits of Crypto Lending, Including Gold-backed Tokens", Jul. 28, 2020. (Year: 2020).*

Li et al., "Can cryptographic tokens be used to secure your next loan?—Exploring the possibility of using cryptocurrency coins and tokens to provide security for loans and other businesstransactions", Dentons, Jul. 5, 2018. (Year: 2018).*

\* cited by examiner

250

```
Determine a digital loan transaction between a lender and a borrower
associated with a blockchain-based digital loan payment network,
wherein the digital loan transaction is based on payment loan tokens
minted for circulation in the blockchain-based digital loan payment
network
252
```

```
Verify a data record that represents the digital loan transaction between
the lender and the borrower associated with the blockchain-based digital
loan payment network
254
```

```
Post the data record that represents the digital loan transaction between
the lender and the borrower associated with the blockchain-based digital
loan payment network in a blockchain
256
```

FIGURE 2B

BLOCKCHAIN-BASED DIGITAL LOAN NETWORK

CROSS-REFERENCE TO RELATED APPLICATIONS

This application claims the benefit under 35 U.S.C. 119(e) of U.S. Provisional Application No. 63/133,098, filed on Dec. 31, 2020, the content of which is hereby incorporated in its entirety.

FIELD OF THE INVENTION

This disclosure relates to the use of blockchain technology to support digital loan and payment networks.

BACKGROUND

A blockchain network is generally comprised of nodes (e.g., computing systems) that collaboratively manage a distributed database (e.g., a decentralized digital ledger). The decentralized digital ledger can be used to record various transactions that occur between network participants in a verifiable manner. For example, nodes in a blockchain network can record payment transactions in blocks that are successively linked together using cryptography to form a blockchain. Typically, each block in the blockchain includes a cryptographic hash of a preceding block in the blockchain. The blockchain can continually be updated and distributed to nodes in the blockchain network. In general, the blockchain improves transparency while ensuring data immutability subject to consensus protocols.

SUMMARY

Various embodiments of the present disclosure can include systems, methods, and non-transitory computer readable media configured to mint payment loan tokens to conduct digital loan transactions within a blockchain-based digital loan payment network. The payment loan tokens are pegged to fiat currency or digital currency. The computing system is a node in the blockchain-based digital loan payment network. A number of payment loan tokens to be provided to a borrower can be determined based on a digital loan transaction. The borrower is a network participant associated with the blockchain-based digital loan payment network. The number of payment loan tokens can be provided for deposit in a digital wallet associated with the borrower based on the digital loan transaction. Payees that receive payment loan tokens from the borrower can redeem the payment loan tokens as fiat or digital currency. A data record that represents the digital loan transaction can be generated. The data record is posted to a blockchain associated with the blockchain-based digital loan payment network.

In an embodiment, the systems, methods, and non-transitory computer readable media perform determining a request from a payee that received payment loan tokens from the borrower to convert one or more payment loan tokens to fiat or digital currency; providing instructions to a computing system associated with a financial institution to convert the one or more payment loan tokens to fiat or digital currency; and causing the one or more payment loan tokens to be burned.

In an embodiment, fiat currency or digital currency that is pegged to the payment loan tokens is reduced based on the conversion of the one or more payment loan tokens to fiat or digital currency.

In an embodiment, the systems, methods, and non-transitory computer readable media perform determining a request from a payee that received payment loan tokens from the borrower to convert one or more payment loan tokens to fiat or digital currency; determining that a cash-out functionality associated with the payment loan tokens has been disabled; and providing a notification to the payee in response to the request, wherein the notification indicates that the request to convert the one or more payment loan tokens to fiat or digital currency has been denied.

In an embodiment, determining that the cash-out functionality associated with the payment loan tokens has been disabled further includes determining that the borrower has defaulted on one or more loan payments associated with the digital loan transaction.

In an embodiment, the cash-out functionality can be disabled to one or more of: (i) prevent redemption of the payment loan tokens possessed by the borrower, (ii) prevent redemption of payment loan tokens associated with the digital loan transaction that are in circulation within the blockchain-based digital loan payment network, or (iii) prevent redemption of payment loan tokens associated with the digital loan that have yet to be repaid.

In an embodiment, the payment loan tokens are loan-specific tokens that are minted specifically for the digital loan transaction, the payment loan tokens are lender-specific tokens that are minted specifically for a lender that processes the digital loan transaction, the payment loan tokens are special purpose tokens that are minted specifically for a specified special purpose, the payment loan tokens are industry-specific tokens that are minted specifically for transactions between entities associated with a particular industry, the payment loan tokens are geography-specific tokens that are minted specifically for transactions between entities associated with a particular geographic region, the payment loan tokens are country-specific tokens that are minted specifically for transactions between entities associated with a particular country, the payment loan tokens are project-specific tokens that are minted specifically for transactions between entities associated with a particular project, or the payment loan tokens are lender-agnostic tokens that can be used to facilitate transactions between entities regardless of lender.

In an embodiment, the systems, methods, and non-transitory computer readable media perform generating a digital loan report based on one or more queries to a blockchain associated with the blockchain-based digital loan payment network, wherein the digital loan report includes transaction information for the digital loan transaction recorded in the blockchain.

In an embodiment, the transaction information provides loan details including at least a principal amount associated with the digital loan transaction, an interest rate associated with the digital loan transaction, and a maturity date associated with the digital loan transaction.

In an embodiment, the blockchain-based digital loan payment network comprises a plurality of nodes including at least one minting node associated with a lender that processes the digital loan transaction and at least one processing node associated with the lender.

In an embodiment, the systems, methods, and non-transitory computer readable media perform determining that payment loan tokens associated with a digital wallet of a payee are inaccessible; determining a payment loan token balance for the digital wallet based on the blockchain associated with the blockchain-based digital loan payment network; and replacing the payment loan tokens that are inaccessible with replacement payment loan tokens.

In an embodiment, replacing the payment loan tokens that are inaccessible with replacement payment loan tokens includes burning the payment loan tokens that are inaccessible; minting the replacement payment loan tokens; and providing the replacement payment loan tokens to a replacement digital wallet associated with the payee.

In an embodiment, the systems, methods, and non-transitory computer readable media perform determining a payment transaction between a first payee that received payment loan tokens from the borrower and a second payee; and generating a data record that represents the payment transaction, wherein the data record is posted to a blockchain associated with the blockchain-based digital loan payment network.

In an embodiment, the systems, methods, and non-transitory computer readable media perform determining a request from the second payee that received payment loan tokens from the first payee to convert one or more payment loan tokens to fiat or digital currency; providing instructions to a computing system associated with a financial institution to convert the one or more payment loan tokens to fiat or digital currency; and causing the one or more payment loan tokens to be burned.

In an embodiment, a lender can define a smart contract to control usage of the payment loan tokens, wherein the smart contract can programmatically control usage of the payment loan tokens for at least one of: a specified purpose, payee, or project.

Various embodiments of the present disclosure can include systems, methods, and non-transitory computer readable media configured to determine a digital loan transaction between a lender and a borrower associated with a blockchain-based digital loan payment network. The digital loan transaction is based on payment loan tokens minted for circulation in the blockchain-based digital loan payment network. A data record that represents the digital loan transaction between the lender and the borrower associated with the blockchain-based digital loan payment network is verified. The data record that represents the digital loan transaction between the lender and the borrower associated with the blockchain-based digital loan payment network is posted in a blockchain.

In an embodiment, the blockchain records digital loan transactions associated with the blockchain-based digital loan payment network.

In an embodiment, the systems, methods, and non-transitory computer readable media perform verifying a different data record that represents a different digital loan transaction between the lender and a different borrower associated with the blockchain-based digital loan payment network, wherein the different digital loan transaction is based on payment loan tokens minted for circulation in the blockchain-based digital loan payment network; and posting the different data record that represents the different digital loan transaction between the lender and the different borrower associated with the blockchain-based digital loan payment network in the blockchain.

In an embodiment, the systems, methods, and non-transitory computer readable media perform generating a digital loan report based on one or more queries to the blockchain, wherein the digital loan report includes transaction information for the digital loan transaction recorded in the blockchain.

In an embodiment, the transaction information provides loan details including at least a principal amount associated with the digital loan transaction, an interest rate associated with the digital loan transaction, and a maturity date associated with the digital loan transaction.

In an embodiment, the systems, methods, and non-transitory computer readable media perform verifying a different data record that represents a different digital loan transaction between a different lender and the borrower associated with a different blockchain-based digital loan payment network, wherein the different digital loan transaction is based on payment loan tokens minted for circulation in the different blockchain-based digital loan payment network; and posting the different data record that represents the different digital loan transaction between the different lender and the borrower associated with the different blockchain-based digital loan payment network in a different blockchain associated with the different blockchain-based digital loan payment network.

In an embodiment, the computing system is a node in a blockchain network that supports blockchain protocols for at least the blockchain-based digital loan payment network and the different blockchain-based digital loan payment network.

In an embodiment, the systems, methods, and non-transitory computer readable media perform generating a digital loan report based on one or more queries to the blockchain associated with the different blockchain-based digital loan payment network, wherein the digital loan report includes transaction information for the different digital loan transaction recorded in the blockchain associated with the different blockchain-based digital loan payment network.

In an embodiment, the lender is permitted to trace digital loan transactions that involve the payment loan tokens through the blockchain-based digital loan payment network.

In an embodiment, the blockchain-based digital loan payment network comprises a plurality of nodes including at least one minting node associated with the lender, at least one first processing node associated with the lender, and at least one second processing node associated with a different lender.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 2B illustrates another flowchart of an example method, in accordance with various embodiments of the present technology.

DETAILED DESCRIPTION

Figure 1A:
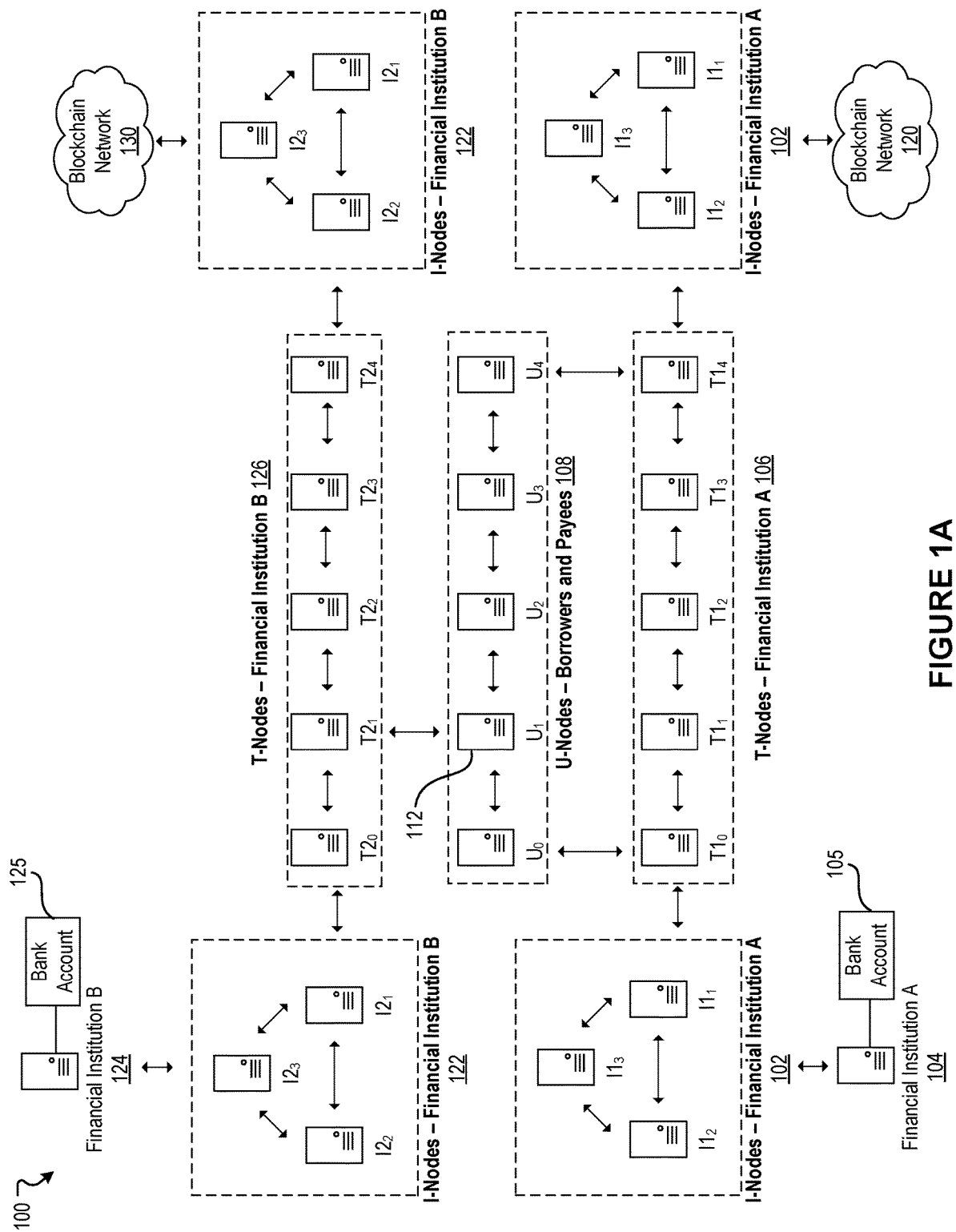
FIG. 1A illustrates an example system for implementing blockchain-based digital loan payment networks, in accordance with various embodiments of the present technology.

A blockchain payment network is generally comprised of nodes (e.g., computing systems) that collaboratively manage a distributed database (e.g., a decentralized digital ledger). The decentralized digital ledger can be used to record various transactions that occur between network participants in a verifiable manner. For example, nodes in a blockchain network can record payment transactions in blocks that are successively linked together using cryptography to form a blockchain. Typically, each block in the blockchain includes a cryptographic hash of a preceding block in the blockchain. The blockchain can continually be updated and distributed to nodes in the blockchain network. In general, the blockchain improves transparency while ensuring data immutability subject to consensus protocols.

Under conventional approaches, lenders (e.g., financial institutions) can loan money to borrowers (e.g., entities, individuals, companies, organizations, etc.) as fiat currency. For example, a financial institution can agree to loan a principal amount of money to a borrower. In this example, the borrower incurs a debt for the principal amount of money and is typically obligated to repay the debt in addition to interest by some maturity date. The loan can be recorded in a document, such as a promissory note, which can specify the principal amount of money being borrowed, an interest rate being charged, the maturity date, among other details. The borrower can spend the loaned fiat currency as desired without the financial institution's knowledge or control. Such conventional approaches are associated with many disadvantages. For example, a financial institution that provides loans in fiat currency can deplete its cash resources over time. For instance, loaned cash resources are typically recovered only after borrowers repay their debts. However, until debts are repaid, the financial institution loses its ability to allocate such cash resources to other investments. Another disadvantage with conventional approaches involves tracing and control of loaned cash resources, if necessary. For example, under conventional approaches, a financial institution that loans fiat currency is typically unable to trace how a borrower spends the loaned fiat currency. As an example, a loan borrowed (or intended) for one construction project can be used for another. Further, the financial institution typically has no control over the loaned fiat currency. For instance, the financial institution generally has no means to prevent or limit losses when a borrower defaults.

A claimed solution rooted in computer technology overcomes problems specifically arising in the realm of computer technology. In various embodiments, lenders (e.g., financial institutions, banks) can provide loans to borrowers through a blockchain-based digital loan payment network. For example, a financial institution can mint payment loan tokens that can be used to conduct transactions within the blockchain-based digital loan payment network. The tokens can be pegged to fiat currency (e.g., U.S. dollars) that is deposited in an account associated with the financial institution. The amount of fiat currency to which the tokens are pegged can be deposited in full or in part, for example, based on a redeemable fiat currency requirement. In this example, the financial institution can provide loans based on its minted tokens. These payment transactions can be recorded in a blockchain associated with the digital loan payment network. The borrower can initiate payments to payees based on tokens received from the financial institution as part of the loan. These payment transactions can similarly be recorded in the blockchain associated with the digital loan payment network. The borrower and its payees can continue initiating token-based payments to other payees as needed. For example, a payee that received a token-based payment from the borrower can provide a token-based payment to another payee. In various embodiments, payees have the option to redeem (or cash out) tokens. For example, a payee that received a token-based payment can initiate an option to exchange the tokens for fiat or digital currency from the loan issuing financial institution. In this example, the payee can transfer the tokens to a digital wallet associated with the financial institution in exchange for fiat or digital currency. Many variations are possible.

It can be especially advantageous for lenders to provide loans based on cryptocurrency tokens instead of fiat currency. For example, by providing loans based on cryptocurrency tokens rather than fiat currency, the present technology allows a financial institution to retain access to its cash resources, which may be invested elsewhere. As a result, the financial institution can earn interest on a digital loan from a borrower in addition to investment income from stayed cash. In general, the borrower can repay principal and interest in tokens, fiat currency, or digital currency. In the event the borrower repays the principal or interest in fiat currency, then the financial institution benefits by gaining access to additional cash resources that can be invested elsewhere.

As another advantage, the present technology allows a lender to implement smart contracts to programmatically control allocation and spending of loans, for example, based upon satisfaction of events or conditions or for specific project. As another advantage, the present technology allows a lender to trace loaned tokens as they circulate from borrowers to payees. For example, the lender can provide a token-based loan to a borrower. The borrower can transfer some tokens to a first payee. The first payee can transfer some tokens to a second payee. In this example, the lender can trace the token payments from the lender to the first payee and from the first payee to the second payee. As another advantage, the present technology allows a lender to reduce its losses from loan defaults. For example, if a borrower defaults on a token-based loan, the lender has the option to prevent the borrower from redeeming any tokens associated with the loan for fiat currency. The lender can also prevent any tokens associated with the loan that are in circulation from being redeemed. That is, the lender has the option to prevent payees of the borrower from redeeming tokens associated with the loan for fiat currency. Further, the lender can also decide to prevent redemption of only those tokens associated with the loan that have not been repaid by the borrower. As another advantage, the present technology allows recovery of lost tokens associated with a digital loan. As another advantage, the present technology helps reduce lender risk by increasing access to cash resources and limiting losses when borrowers default. As a result, the present technology allows the lender to provide a lower interest rate to borrowers. As yet another advantage, the present technology allows lenders to easily identify payees that receive token-based payments from borrowers. As a result, the present technology allows lenders to engage those payees, for example, to pursue banking relationships. More details describing the present technology are provided below.

FIG. 1A illustrates a system 100 for implementing blockchain-based digital loan payment networks. The system 100 can include I-Nodes 102 associated with a lender ("Financial Institution A"), T-Nodes 106 associated with Financial Institution A, U-Nodes 108 associated with borrowers that have digital loans with Financial Institution A or another lender (e.g., "Financial Institution B"), and U-Nodes 108 associated with payees that can receive token-based payments from those borrowers. For example, an I-Node 102 can be implemented as an I-Node module 404, as described in reference to FIG. 4. A T-Node 106 can be implemented as a T-Node module 504, as described in reference to FIG. 5. Further, a U-Node 108 can be implemented as a U-Node module 604, as described in reference to FIG. 6. In some embodiments, the I-Nodes 102, T-Nodes 106, and U-Nodes 108 can participate in a blockchain network 120. In some embodiments, the I-Nodes 102 and T-Nodes 106 can participate in the blockchain network 120 as nodes while the U-Nodes 108 participate as digital wallets. In some embodiments, a computing system 104 associated with Financial Institution A can implement a digital wallet that facilitates the transfer of monies from borrowers (e.g., U-Nodes 108) to Financial Institution A. For example, the digital wallet can facilitate the transfer of fiat currency, tokens, or digital currency from the borrower to Financial Institution A to digitally submit payments associated with a loan. In some embodiments, the computing system 104 associated with the Financial Institution A can also implement a U-Node module 604, as described in reference to FIG. 6. Many variations are possible.

The blockchain network 120 can be associated with a blockchain based on a blockchain protocol. The blockchain can be used to record loan transactions that occur in a digital loan payment network associated with Financial Institution A. For example, the blockchain associated with the blockchain network 120 can be a "private" blockchain that is restricted to Financial Institution A, borrowers that receive token-based loans from Financial Institution A, and payees that receive payments from borrowers in tokens. In some embodiments, the I-Nodes 102 can be configured to post blockchain transactions to the blockchain associated with the blockchain network 120. In such embodiments, the T-Nodes 106 can be configured to validate transactions posted to the blockchain. In some embodiments, the both I-Nodes 102 and T-Nodes 106 can be configured to post and validate blockchain transactions to the blockchain associated with the blockchain network 120. In general, transactions posted to the blockchain can be validated using generally known techniques including, for example, proof of work calculations and confirmations, proof of stake calculations and confirmations, proof of authority calculations and confirmations, proof of history calculations and confirmations, proof of two calculations and confirmations, and proof of N calculations and confirmations, to name some examples.

In various embodiments, the I-Nodes 102 and the T-Nodes 106 can be configured to manage a blockchain-based digital loan payment network associated with Financial Institution A. For example, the I-Nodes 102 can be configured to mint and burn cryptocurrency tokens as needed to support the blockchain-based digital loan payment network. In some embodiments, the minted tokens are stablecoins pegged to a fiat currency. For example, a single token can be pegged to a single U.S. dollar. Thus, when minting tokens under such embodiments, Financial Institution A can cause some amount of fiat currency to be deposited, for example, in a bank (or escrow) account 105 associated with the Financial Institution A. The amount deposited can be consistent with an amount of tokens to be minted. For example, Financial Institution A can deposit $100 to mint 100 tokens. However, Financial Institution A can also deposit a lesser amount of fiat currency to mint the tokens. For example, Financial Institution A may only deposit an amount of fiat currency that is payable at any given time, such as $60 to mint 100 tokens. Once deposited, the I-Nodes 102 can be instructed to mint tokens. The I-Nodes 102 can also be instructed to transact with borrowers based on the minted tokens. For example, an I-Node 102 can be instructed to initiate a digital loan payment of 1,000 tokens to a U-Node 108 associated with a borrower. The I-Nodes 102 can be configured to mint different types of tokens depending on the implementation. For example, in an embodiment, the I-Nodes 102 can mint lender-specific tokens. That is, the I-Nodes 102 mint tokens that are specific to Financial Institution A. In this embodiment, borrowers can use the minted tokens to repay any loans provided by Financial Institution A. Further, payees can exchange lender-specific tokens for fiat currency through Financial Institution A. In another embodiment, the I-Nodes 102 can mint loan-specific tokens. That is, the I-Nodes 102 mint tokens that are specific to a loan provided by Financial Institution A. In this embodiment, a borrower that received the loan from Financial Institution A can use loan-specific tokens to repay the loan provided by Financial Institution A. Further, payees can exchange loan-specific tokens for fiat currency through Financial Institution A. In yet another embodiment, the I-Nodes 102 can mint universal tokens that are accepted by Financial Institution A. In such embodiments, other lenders (e.g., Financial Institution B) can also mint and accept the universal tokens. In this embodiment, borrowers can use universal tokens to repay any loans provided by Financial Institution A or Financial Institution B. Further, payees can exchange universal tokens for fiat currency through Financial Institution A or Financial Institution B. Many variations are possible. In some embodiments, the I-Nodes 102 can mint special purpose tokens that facilitate transactions that relate to a specified purpose. In some embodiments, the I-Nodes 102 can mint industry-specific tokens that facilitate transactions between entities associated with a particular industry. In some embodiments, the I-Nodes 102 can mint geographic-specific tokens that facilitate transactions between entities associated with a particular geographic region. In some embodiments, the I-Nodes 102 can mint country-specific tokens that facilitate transactions between entities associated with a particular country. In some embodiments, the I-Nodes 102 can mint project-specific tokens that facilitate transactions between entities associated with a particular project. In some embodiments, the I-Nodes 102 can mint lender-agnostic tokens that can be used to facilitate transactions between entities regardless of lender.

The I-Nodes 102 can be configured to generate data records reflecting loan transactions. A data record can correspond to a blockchain transaction to be posted to the blockchain associated with the blockchain network 120. The data record may include various details describing the transaction, such a transaction description (e.g., transaction date, sender address, destination address, transaction amount), payment purpose, recipient, project, entity information (e.g., entity name, wallet address, etc.), loan details (e.g., principal amount, interest rate, maturity date, etc.), among other information. The data record may then be posted to the blockchain. For example, the data record may be posted by the I-Node 102. The data record may be subsequently verified by one or more nodes included in the blockchain network 120, such as the T-Nodes 106. The data record may then be a part of the blockchain associated with the blockchain network 120.

A borrower that accepts a digital loan from Financial Institution A can conduct transactions with other entities based on tokens in its possession. For example, the borrower can pay 80 tokens to a U-Node 108 associated with a first payee. Similarly, the first payee can pay 50 tokens to a U-Node 108 associated with a second payee. In various embodiments, payees can convert tokens to fiat (or digital) currency through the blockchain network 120. For example, the first payee can interact with the I-Nodes 102 and/or the computing system 104 associated with Financial Institution A to exchange the remaining 30 tokens for fiat currency, e.g., 30 USD. In this example, the first payee can transfer the 30 tokens to a digital wallet associated with Financial Institution A, such as the computing system 104. The computing system 104 can then be instructed to transfer 30 USD from the bank account 105 to a bank account associated with the first payee. Once transferred, the exchanged tokens can be burned (or cryptographically destroyed). Similarly, the second payee can interact with the I-Nodes 102 and/or the computing system 104 associated with Financial Institution A to exchange the 50 tokens for fiat currency, e.g., 50 USD. Additionally, in various embodiments, the borrower can make payments associated with a loan, such as principal and interest, through the blockchain network 120. For example, the borrower can pay the principal or interest in tokens, fiat currency, or digital currency.

The system 100 can include I-Nodes 122 associated with Financial Institution B, T-Nodes 126 associated with Financial Institution B, U-Nodes 108 associated with borrowers that have loans with Financial Institution A or Financial Institution B, and U-Nodes 108 associated with payees that can receive token-based payments from those borrowers. For example, an I-Node 122 can be implemented as an I-Node module 404, as described in reference to FIG. 4. A T-Node 126 can be implemented as a T-Node module 504, as described in reference to FIG. 5. Further, a U-Node 108 can be implemented as a U-Node module 604, as described in reference to FIG. 6. In some embodiments, the I-Nodes 122, T-Nodes 126, and U-Nodes 108 can participate in a blockchain network 130. In some embodiments, the I-Nodes 122 and T-Nodes 126 can participate in the blockchain network 130 as nodes while the U-Nodes 108 participate as digital wallets. In some embodiments, a computing system 124 associated with Financial Institution B can implement a digital wallet that facilitates the transfer of monies from borrowers (e.g., U-Nodes 108) to Financial Institution B. For example, the digital wallet can facilitate the transfer of fiat currency, tokens, or digital currency from the borrower to Financial Institution B to digitally submit payments associated with a loan. In some embodiments, the computing system 124 associated with the Financial Institution B can also implement a U-Node module 604, as described in reference to FIG. 6. Many variations are possible. In some instances, payees may be associated with multiple blockchain-based digital loan payment networks. In such instances, a U-Node associated with the payee can be associated with multiple blockchain networks. For example, in FIG. 1A, a U-Node 112 controlled by a payee can be included in both the blockchain-based digital loan payment network associated with Financial Institution A (e.g., the blockchain network 120) and the blockchain-based digital loan payment network associated with Financial Institution B (e.g., the blockchain network 130). In this example, the U-Node 112 can be configured to implement blockchain protocols utilized by both the blockchain network 120 and the blockchain network 130. Many variations are possible.

The blockchain network 130 can be associated with a blockchain based on a blockchain protocol. The blockchain can be used to record loan transactions that occur in a digital loan payment network associated with Financial Institution B. For example, the blockchain associated with the blockchain network 130 can be a "private" blockchain that is restricted to Financial Institution B, borrowers that receive token-based loans from Financial Institution B, and payees that receive payment from borrowers in tokens. In some embodiments, the I-Nodes 122 can be configured to post blockchain transactions to the blockchain associated with the blockchain network 130. In such embodiments, the T-Nodes 126 can be configured to validate transactions posted to the blockchain. In some embodiments, the both I-Nodes 122 and T-Nodes 126 can be configured to post and validate blockchain transactions to the blockchain associated with the blockchain network 130. In general, transactions posted to the blockchain can be validated using generally known techniques including, for example, proof of work calculations and confirmations, proof of stake calculations and confirmations, proof of authority calculations and confirmations, proof of history calculations and confirmations, proof of two calculations and confirmations, and proof of N calculations and confirmations, to name some examples.

The I-Nodes 122 and the T-Nodes 126 can be configured to manage the blockchain-based digital loan payment network associated with Financial Institution B. For example, the I-Nodes 122 can be configured to mint and burn cryptocurrency tokens as needed to support the blockchain-based digital loan payment network, as described above. The I-Nodes 122 can also be instructed to transact with borrowers based on the minted tokens.

The I-Nodes 122 can be configured to generate data records reflecting loan transactions. A data record can correspond to a blockchain transaction to be posted to the blockchain associated with the blockchain network 130. The data record may include various details describing the transaction, such a transaction description (e.g., transaction date, sender address, destination address, transaction amount), entity information (e.g., entity name, wallet address, etc.), loan details (e.g., principal amount, interest rate, maturity date, etc.), payment purpose, recipient, project, among other information. The data record may then be posted to the blockchain. For example, the data record may be posted by the I-Node 122. The data record may be subsequently verified by one or more nodes included in the blockchain network 130, such as the T-Nodes 126. The data record may then be a part of the blockchain associated with the blockchain network 130.

A borrower that accepts a loan from Financial Institution B can conduct transactions with other entities based on tokens in its possession. For example, the borrower can pay 160 tokens to a U-Node 108 associated with a first payee. Similarly, the first payee can pay 100 tokens to a U-Node 108 associated with a second payee. In various embodiments, payees can convert tokens to fiat (or digital) currency through the blockchain network 130. For example, the first payee can interact with the I-Nodes 122 and/or the computing system 124 associated with Financial Institution B to exchange the remaining 60 tokens for fiat currency. In this example, the first payee can transfer the 60 tokens to a digital wallet associated with Financial Institution B, such as the computing system 124. The computing system 124 can then be instructed to transfer a corresponding amount of fiat currency (e.g., 60 USD) from the bank account 125 to a bank account associated with the first payee. Once transferred, the exchanged tokens can be burned (or cryptographically destroyed). Similarly, the second payee can interact with the I-Nodes 122 and/or the computing system 124 associated with Financial Institution B to exchange the 100 tokens for fiat currency. Additionally, in various embodiments, the borrower can make payments associated with a loan, such as principal and interest, through the blockchain network 130.

Figure 1B:
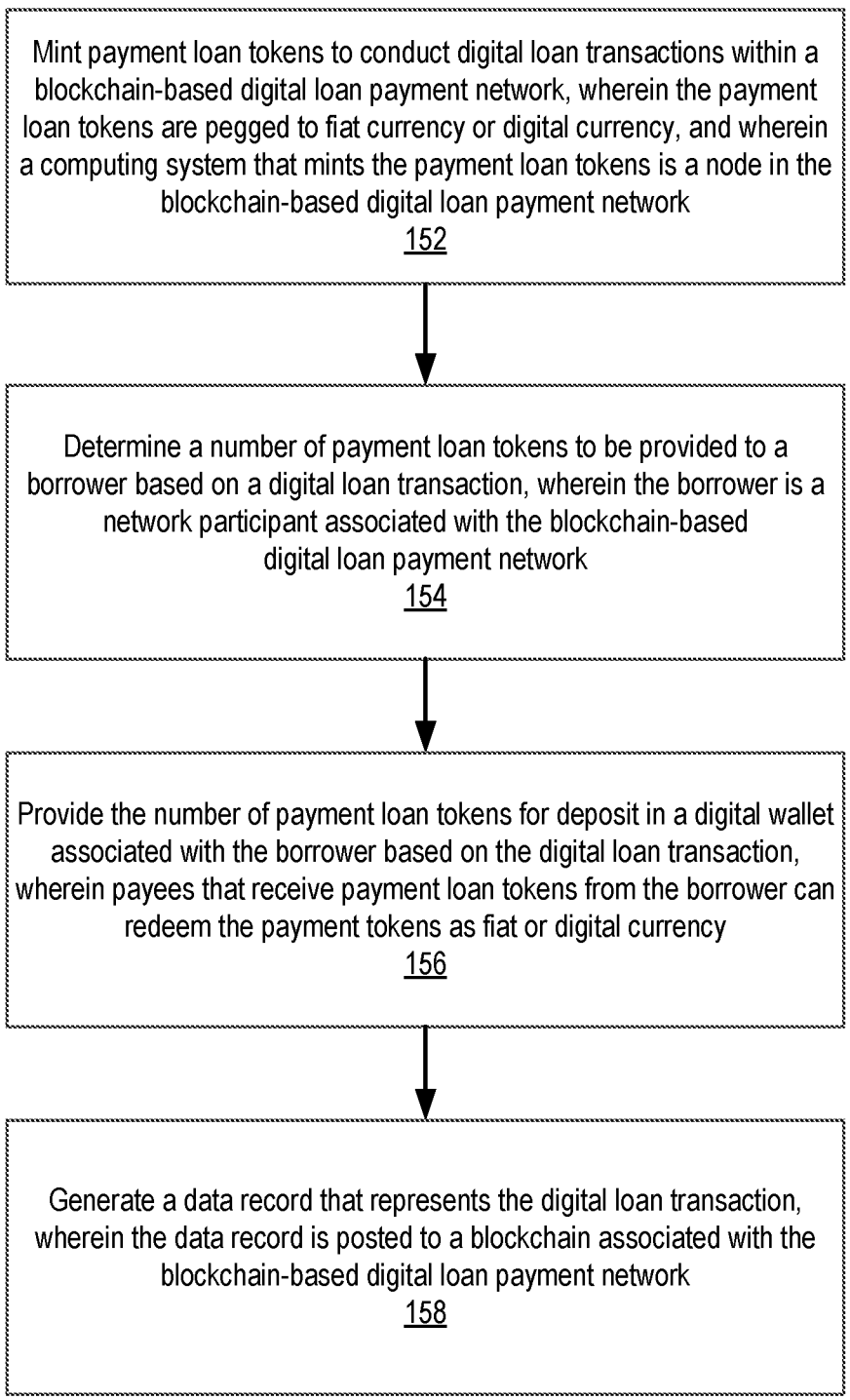
FIG. 1B illustrates a flowchart of an example method, in accordance with various embodiments of the present technology.

FIG. 1B illustrates a flowchart of an example method 150, according to various embodiments of the present disclosure. For example, the method 150 can be performed by the system 100 of FIG. 1A.

At block 152, payment loan tokens to conduct digital loan transactions within a blockchain-based digital loan payment network are minted by a computing system. The payment loan tokens are pegged to fiat currency or digital currency. The computing system is a node in the blockchain-based digital loan payment network. At block 154, a number of payment loan tokens to be provided to a borrower can be determined based on a digital loan transaction. The borrower is a network participant associated with the blockchain-based digital loan payment network. At block 156, the number of payment loan tokens can be provided for deposit in a digital wallet associated with the borrower based on the digital loan transaction. Payees that receive payment loan tokens from the borrower can redeem the payment loan tokens as fiat or digital currency. At block 158, a data record that represents the digital loan transaction can be generated. The data record is posted to a blockchain associated with the blockchain-based digital loan payment network.

The operations of method 150 are intended to be illustrative. Depending on the implementation, the example method 150 may include additional, fewer, or alternative steps performed in various orders or in parallel. The example method 150 may be implemented in various computing systems or devices including one or more processors.

Figure 2A:
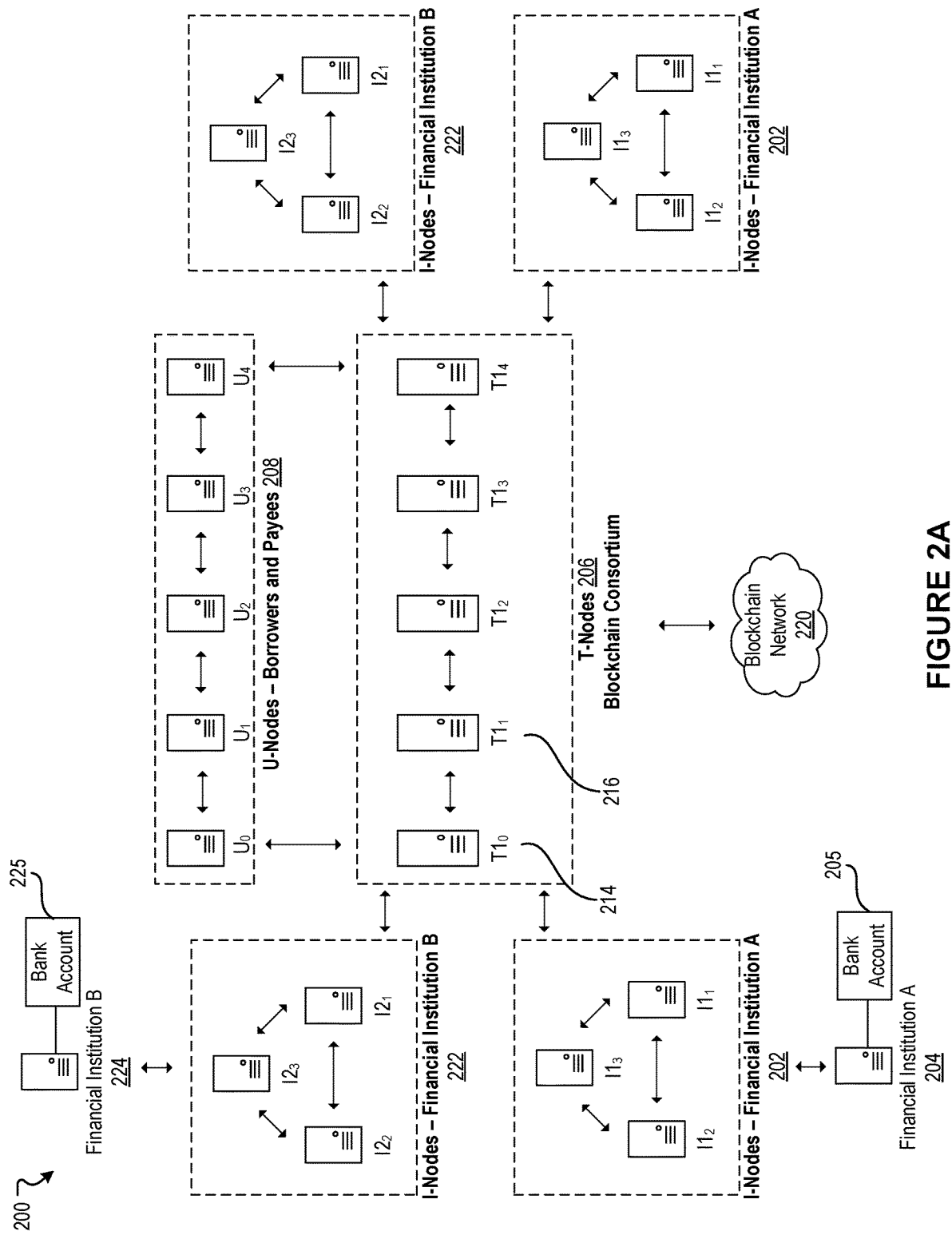
FIG. 2A illustrates an example system for implementing a hosted blockchain-based digital loan payment network, in accordance with various embodiments of the present technology.

FIG. 2A illustrates a system 200 for implementing a blockchain-based digital loan payment network. The system 200 can include I-Nodes 202 associated with a lender ("Financial Institution A"), I-Nodes 222 associated with another lender ("Financial Institution B"), T-Nodes 206 associated with a consortium (e.g., banking consortium), U-Nodes 208 associated with borrowers that have digital loans with lenders (e.g., Financial Institution A, Financial Institution B, etc.), and U-Nodes 208 associated with payees that can receive token-based payments from borrowers. In some embodiments, each lender associated with the banking consortium can contribute and manage one or more T-Nodes 206. For example, Financial Institution A can manage a T-Node 214 and Financial Institution B can manage a T-Node 216. In another embodiment, the T-Nodes 206 can be hosted by a third-party service provider. In various embodiments, I-Nodes 202 and I-Nodes 222 can be implemented as I-Node modules 404, as described in reference to FIG. 4. A T-Node 206 can be implemented as a T-Node module 504, as described in reference to FIG. 5. Further, a U-Node 208 can be implemented as a U-Node module 604, as described in reference to FIG. 6. In some embodiments, the I-Nodes 202, I-Nodes 222, T-Nodes 206, and U-Nodes 208 can participate in a blockchain network 220. In some embodiments, the I-Nodes 202, I-Nodes 222, and T-Nodes 206 can participate in the blockchain network 220 as nodes while the U-Nodes 208 participate as digital wallets. Many variations are possible.

In some embodiments, a computing system 204 associated with Financial Institution A can implement a digital wallet that facilitates the transfer of monies from borrowers (e.g., U-Nodes 208) to Financial Institution A. For example, the computing system 204 can facilitate digital transfers of fiat currency, tokens, or digital currency from a borrower to Financial Institution A, for example, to submit payments associated with a loan. The computing system 204 can also facilitate conversion of payment loan tokens to fiat or digital currency. In some embodiments, the computing system 204 associated with the Financial Institution A can also implement a U-Node module 604, as described in reference to FIG. 6. Similarly, a computing system 224 associated with Financial Institution B can implement a digital wallet that facilitates the transfer of monies from borrowers (e.g., U-Nodes 208) to Financial Institution B. For example, the computing system 224 can facilitate digital transfers of fiat currency, tokens, or digital currency from a borrower to Financial Institution B, for example, to submit payments associated with a loan. The computing system 224 can also facilitate conversion of payment loan tokens to fiat or digital currency. In some embodiments, the computing system 224 associated with the Financial Institution B can also implement a U-Node module 604, as described in reference to FIG. 6.

The blockchain network 220 can be associated with a blockchain. In various embodiments, the blockchain can be used to record transactions that involve various tokens circulated in different blockchain-based digital loan payment networks. That is, the blockchain supports transactions based on different types of payment loan tokens. For example, in FIG. 2A, the blockchain can be used to record transactions that occur in digital loan payment networks associated with both Financial Institution A and Financial Institution B. For example, the blockchain can support transactions that involve payments based on at least payment loan tokens minted by Financial Institution A (e.g., the I-Nodes 202) and transactions that involve payments based on payment loan tokens minted by Financial Institution B (e.g., the I-Nodes 222). In some embodiments, the blockchain associated with the blockchain network 220 can be a "private" blockchain that is restricted to lenders (e.g., Financial Institution A, Financial Institution B), borrowers, and payees. In some embodiments, the blockchain associated with the blockchain network 220 can be hosted by a third-party service provider. In some embodiments, the I-Nodes 202, I-Nodes 222, and T-Nodes 206 can be configured to post blockchain transactions to the blockchain associated with the blockchain network 220. The I-Nodes 202, I-Nodes 222, and T-Nodes 206 can also be configured to validate transactions posted to the blockchain. In some embodiments, only T-Nodes 206 can be configured to post transactions to the blockchain associated with the blockchain network 220 and validate transactions posted to the blockchain. In general, transactions posted to the blockchain can be validated using generally known techniques including, for example, proof of work calculations and confirmations, proof of stake calculations and confirmations, proof of authority calculations and confirmations, proof of history calculations and confirmations, proof of two calculations and confirmations, and proof of N calculations and confirmations, to name some examples.

The I-Nodes 202 can be configured to manage a blockchain-based digital loan payment network for Financial Institution A. For example, the I-Nodes 202 can be configured to mint and burn payment loan tokens as needed to support the blockchain-based digital loan payment network. In some embodiments, the minted tokens are stable coins pegged to a fiat or digital currency. For example, a single token can be pegged to a single U.S. dollar. Thus, when minting tokens under such embodiments, Financial Institution A can cause some amount of fiat currency to be deposited in a bank account 205, for example, through the computing system 204 associated with Financial Institution A. The amount deposited can be consistent with or less than an amount of tokens to be minted. Once deposited, the I-Nodes 202 can be instructed to mint tokens commensurate to the amount of fiat currency deposited or payable loan amount. The I-Nodes 202 can also be instructed to transact with loan borrowers based on the minted tokens. The I-Nodes 202 can be configured to generate a data record reflecting each loan transaction. The data record can correspond to a blockchain transaction to be posted to the blockchain associated with the blockchain network 220. The data record may include various details describing the transaction, such a transaction description (e.g., transaction date, sender address, destination address, transaction amount), entity information (e.g., entity name, wallet address, etc.), loan details (e.g., principal amount, interest rate, maturity date, etc.), payment purpose, recipient, project, among other information. The data record may then be posted to the blockchain. For example, the data record may be posted by the I-Node 202. The data record may be subsequently verified by one or more nodes included in the blockchain network 220, such as the T-Nodes 206. The data record may then be a part of the blockchain associated with the blockchain network 220. For example, an I-Node 202 can be instructed to provide digital loan payments based on minted tokens to borrowers. Borrowers can transact with payees based on the minted tokens. Borrowers can also use the minted tokes to repay a loan principal or interest to Financial Institution A. Further, payees can redeem (or exchange) tokens received to fiat or digital currency through Financial Institution A.

The I-Nodes 202 can be configured to mint different types of tokens depending on the implementation. For example, in an embodiment, the I-Nodes 202 can mint lender-specific tokens. That is, the I-Nodes 202 mint tokens that are specific to Financial Institution A. In this embodiment, borrowers can use the minted tokens to repay any loans provided by Financial Institution A. Further, payees can exchange lender-specific tokens for fiat currency through Financial Institution A. In another embodiment, the I-Nodes 202 can mint loan-specific tokens. That is, the I-Nodes 202 mint tokens that are specific to a loan provided by Financial Institution A. In this embodiment, a borrower that received the loan from Financial Institution A can use loan-specific tokens to repay the loan provided by Financial Institution A. Further, payees can exchange loan-specific tokens for fiat currency through Financial Institution A. In yet another embodiment, the I-Nodes 202 can mint universal tokens that are accepted by Financial Institution A. In such embodiments, other lenders (e.g., Financial Institution B) can also mint and accept the universal tokens. In this embodiment, borrowers can use universal tokens to repay any loans provided by Financial Institution A or Financial Institution B. Further, payees can exchange universal tokens for fiat currency through Financial Institution A or Financial Institution B. Many variations are possible. In some embodiments, the I-Nodes 202 can mint special purpose tokens that facilitate transactions that relate to a specified purpose. In some embodiments, the I-Nodes 202 can mint industry-specific tokens that facilitate transactions between entities associated with a particular industry. In some embodiments, the I-Nodes 202 can mint geographic-specific tokens that facilitate transactions between entities associated with a particular geographic region. In some embodiments, the I-Nodes 202 can mint country-specific tokens that facilitate transactions between entities associated with a particular country. In some embodiments, the I-Nodes 202 can mint project-specific tokens that facilitate transactions between entities associated with a particular project. In some embodiments, the I-Nodes 202 can mint lender-agnostic tokens that can be used to facilitate transactions between entities regardless of lender.

For example, when minting tokens under such embodiments, Financial Institution A can cause some amount of fiat currency to be deposited in the bank (or escrow) account 205. The amount deposited can be consistent with or less than an amount of tokens to be minted. For example, Financial Institution A can deposit $100 to mint 100 tokens. In another example, Financial Institution A can deposit $50 to mint 100 tokens. Once deposited, the I-Nodes 202 can be instructed to mint tokens commensurate to the amount of fiat currency deposited or payable loan amount. The I-Nodes 202 can also be instructed to transact with loan borrowers based on the minted tokens. For example, an I-Node 202 can be instructed to initiate a payment of 1,000 tokens to a borrower. The I-Node 202 can be configured to generate a data record reflecting the loan transaction. The data record can correspond to a blockchain transaction to be posted to the blockchain associated with the blockchain network 220. The data record may include various details describing the transaction, such as a transaction description (e.g., transaction date, sender address, destination address, transaction amount), entity information (e.g., entity name, wallet address, etc.), loan details (e.g., principal amount, interest rate, maturity date, etc.), payment purpose, recipient, project, among other information. The data record may then be posted to the blockchain. For example, the data record may be posted and verified by one or more nodes included in the blockchain network 220, such as the T-Nodes 206. The data record may then be a part of the blockchain associated with the blockchain network 220. The borrower can conduct transactions with other entities based on tokens available to the borrower. For example, the borrower can pay 20 tokens to a network participant that corresponds to a payee. As one example, the borrower can pay Company A for an invoice in payment loan tokens. Company A has the option to convert the payment loan tokens received from the borrower to fiat or digital currency. In this example, Company A can interact with the I-Nodes 202 and/or the computing system 204 associated with Financial Institution A to exchange the tokens for fiat currency. The exchanged tokens can be burned (or cryptographically destroyed).

Similarly, the I-Nodes 222 can be configured to manage a blockchain-based digital loan payment network for Financial Institution B. For example, the I-Nodes 222 can be configured to mint and burn payment loan tokens as needed to support the blockchain-based digital loan payment network. In some embodiments, the minted tokens are stable coins pegged to a fiat or digital currency. For example, a single token can be pegged to a single U.S. dollar. Thus, when minting tokens under such embodiments, Financial Institution B can cause some amount of fiat currency to be deposited in a bank (or escrow) account 225, for example, through the computing system 224 associated with Financial Institution B. The amount deposited can be consistent with or less than an amount of tokens to be minted. Once deposited, the I-Nodes 222 can be instructed to mint tokens commensurate to the amount of fiat currency deposited or payable loan amount. The I-Nodes 222 can also be instructed to transact with loan borrowers based on the minted tokens. The I-Nodes 222 can be configured to generate a data record reflecting each loan transaction. The data record can correspond to a blockchain transaction to be posted to the blockchain associated with the blockchain network 220. The data record may include various details describing the transaction, such a transaction description (e.g., transaction date, sender address, destination address, transaction amount), entity information (e.g., entity name, wallet address, etc.), loan details (e.g., principal amount, interest rate, maturity date, etc.), payment purpose, recipient, project, among other information. The data record may then be posted to the blockchain. For example, the data record may be posted by the I-Node 222. The data record may be subsequently verified by one or more nodes included in the blockchain network 220, such as the T-Nodes 206. The data record may then be a part of the blockchain associated with the blockchain network 220. For example, an I-Node 222 can be instructed to provide digital loan payments based on minted tokens to borrowers. Borrowers can transact with payees based on the minted tokens. Borrowers can also use the minted tokes to repay a loan principal or interest to Financial Institution B. Further, payees can redeem (or exchange) tokens received to fiat or digital currency through Financial Institution B.

The I-Nodes 222 can be configured to mint different types of tokens depending on the implementation. For example, in an embodiment, the I-Nodes 222 can mint lender-specific tokens. That is, the I-Nodes 222 mint tokens that are specific to Financial Institution B. In this embodiment, borrowers can use the minted tokens to repay any loans provided by Financial Institution B. Further, payees can exchange lender-specific tokens for fiat currency through Financial Institution B. In another embodiment, the I-Nodes 222 can mint loan-specific tokens. That is, the I-Nodes 222 mint tokens that are specific to a loan provided by Financial Institution B. In this embodiment, a borrower that received the loan from Financial Institution B can use loan-specific tokens to repay the loan provided by Financial Institution B. Further, payees can exchange loan-specific tokens for fiat currency through Financial Institution B. In yet another embodiment, the I-Nodes 222 can mint universal tokens that are accepted by Financial Institution B. In such embodiments, other lenders (e.g., Financial Institution A) can also mint and accept the universal tokens. In this embodiment, borrowers can use universal tokens to repay any loans provided by Financial Institution B or Financial Institution A. Further, payees can exchange universal tokens for fiat currency through Financial Institution B or Financial Institution A. Many variations are possible. In some embodiments, the I-Nodes 102 can mint special purpose tokens that facilitate transactions that relate to a specified purpose. In some embodiments, the I-Nodes 102 can mint industry-specific tokens that facilitate transactions between entities associated with a particular industry. In some embodiments, the I-Nodes 102 can mint geographic-specific tokens that facilitate transactions between entities associated with a particular geographic region. In some embodiments, the I-Nodes 102 can mint country-specific tokens that facilitate transactions between entities associated with a particular country. In some embodiments, the I-Nodes 102 can mint project-specific tokens that facilitate transactions between entities associated with a particular project. In some embodiments, the I-Nodes 102 can mint lender-agnostic tokens that can be used to facilitate transactions between entities regardless of lender.

For example, when minting tokens under such embodiments, Financial Institution B can cause some amount of fiat currency to be deposited in the bank account 225. The amount deposited can be consistent with or less than an amount of tokens to be minted. For example, Financial Institution B can deposit $100 to mint 100 tokens. In another example, Financial Institution B can deposit $50 to mint 100 tokens. Once deposited, the I-Nodes 222 can be instructed to mint tokens commensurate to the amount of fiat currency deposited or payable loan amount. The I-Nodes 222 can also be instructed to transact with loan borrowers based on the minted tokens. For example, an I-Node 222 can be instructed to initiate a payment of 1,000 tokens to a borrower. The I-Node 222 can be configured to generate a data record reflecting the loan transaction. The data record can correspond to a blockchain transaction to be posted to the blockchain associated with the blockchain network 220. The data record may include various details describing the transaction, such a transaction description (e.g., transaction date, sender address, destination address, transaction amount), entity information (e.g., entity name, wallet address, etc.), loan details (e.g., principal amount, interest rate, maturity date, etc.), payment purpose, recipient, project, among other information. The data record may then be posted to the blockchain. For example, the data record may be posted and verified by one or more nodes included in the blockchain network 220, such as the T-Nodes 206. The data record may then be a part of the blockchain associated with the blockchain network 220. The borrower can conduct transactions with other entities based on tokens available to the borrower. For example, the borrower can pay 20 tokens to a network participant that corresponds to a payee. As one example, the borrower can pay Company A for an invoice in payment loan tokens. Company A has the option to convert the payment loan tokens received from the borrower to fiat or digital currency. In this example, Company A can interact with the I-Nodes 222 and/or the computing system 224 associated with Financial Institution B to exchange the tokens for fiat currency. The exchanged tokens can be burned (or cryptographically destroyed).

FIG. 2B illustrates a flowchart of an example method 250, according to various embodiments of the present disclosure. For example, the method 250 can be performed by the system 200 of FIG. 2A.

At block 252, a determination is made of a digital loan transaction between a lender and a borrower associated with a blockchain-based digital loan payment network. The digital loan transaction is based on payment loan tokens minted for circulation in the blockchain-based digital loan payment network. At block 254, a data record that represents the digital loan transaction between the lender and the borrower associated with the blockchain-based digital loan payment network is verified. At block 256, the data record that represents the digital loan transaction between the lender and the borrower associated with the blockchain-based digital loan payment network is posted in a blockchain.

The operations of method 250 are intended to be illustrative. Depending on the implementation, the example method 250 may include additional, fewer, or alternative steps performed in various orders or in parallel. The example method 250 may be implemented in various computing systems or devices including one or more processors.

Figure 3:
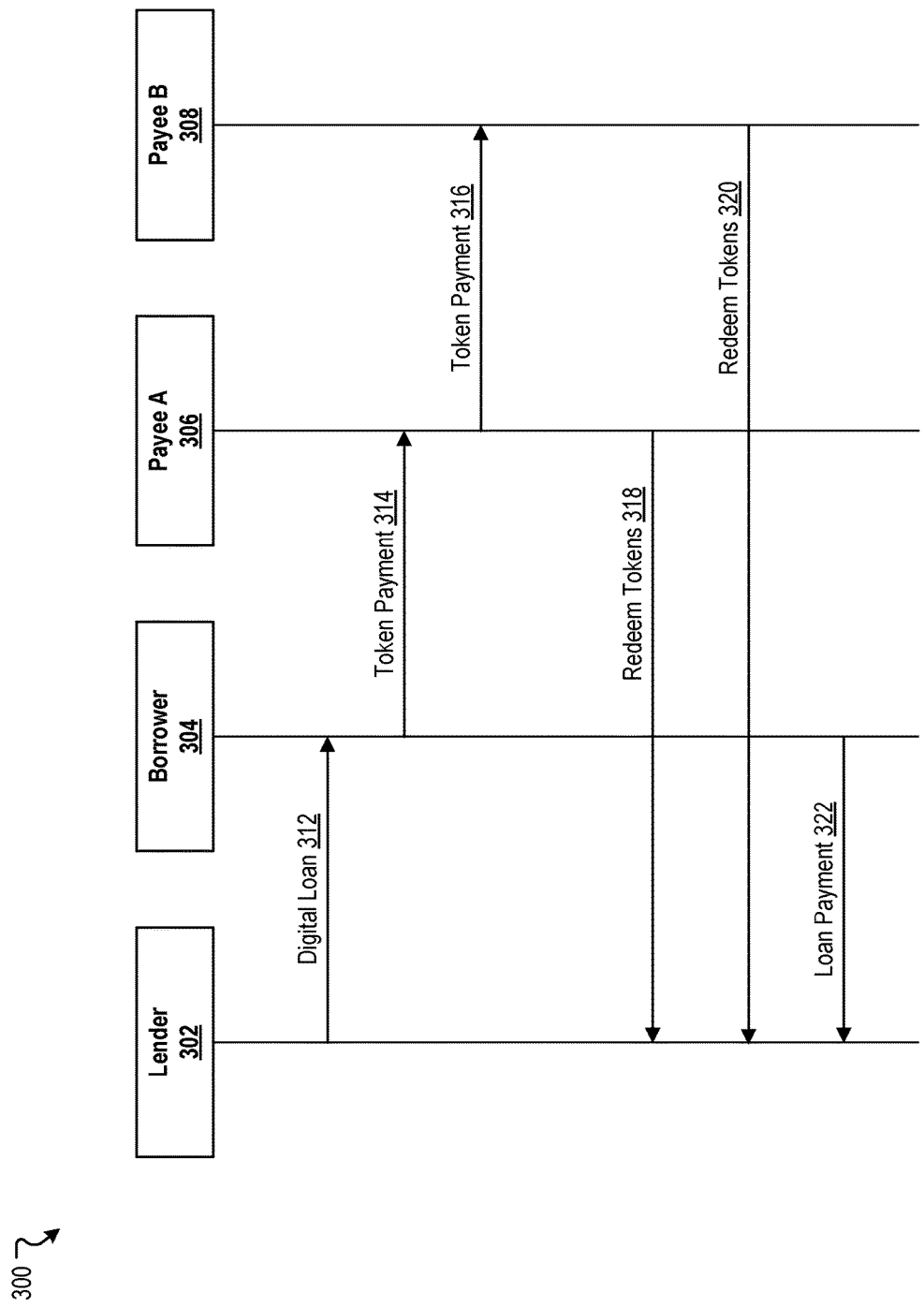
FIG. 3 illustrates an example sequence diagram, in accordance with various embodiments of the present technology.

FIG. 3 illustrates an example sequence diagram 300, in accordance with various embodiments of the present technology. The example sequence diagram 300 illustrates an example set of interactions (or transactions) between a lender 302, borrower 304, Payee A 306, and Payee B 308 through a blockchain-based digital loan payment network in accordance with various embodiments of the present technology. It should be appreciated that there can be additional, fewer, or alternative steps performed in similar or alternative orders, or in parallel, within the scope of the various embodiments unless otherwise stated.

For example, the lender 302 can mint cryptocurrency (or payment loan tokens) that can be used to conduct transactions within the blockchain-based digital loan payment network. The tokens can be pegged to fiat or digital currency that is deposited partially or fully in an account (e.g., bank account, escrow account, etc.) associated with the lender 302. The lender 302 can mint payment loan tokens based on the deposited fiat currency or loan amount. At step 312, the lender 302 can provide a digital loan token to the borrower 304. The digital loan transaction can be recorded in a blockchain associated with the blockchain-based digital loan payment network, as described herein. At step 314, the borrower 304 makes a payment to Payee A 306 in the amount of 100 tokens. At step 316, Payee A 306 makes a payment to Payee B 308 in the amount of 80 tokens. At step 318, Payee A 306 redeems 20 tokens in exchange for fiat or digital currency. For example, the lender 302 can receive the 20 tokens and in response provide Payee A 306 with fiat or digital currency based on the redeemed 20 tokens. The fiat or digital currency can be withdrawn from the escrow account associated with the lender 302. At step 320, Payee B 308 redeems 30 tokens in exchange for fiat or digital currency. For example, the lender 302 can receive the 30 tokens and in response provide Payee B 308 with fiat or digital currency based on the redeemed 30 tokens. The fiat or digital currency can be withdrawn from the escrow account associated with the lender 302. At step 322, the borrower 304 can make a loan payment to the lender 302. For example, the borrower 304 can repay its loan principal or interest associated with the loan. In various embodiments, the borrower 304 can make the loan payment using tokens, fiat currency, and/or digital currency. In general, when tokens are redeemed, the lender 302 can redeem out of the escrow account or a different account if the escrow account has insufficient funds.

In various embodiments, the lender 302 can trace transactions that involve tokens provided as a loan to the borrower 304. In the example of FIG. 3, the lender 302 can access transaction details associated with tokens paid to Payee A at step 314. The transaction details can identify Payee A as a payee and an amount of tokens provided to Payee A. Similarly, the lender 302 can access transaction details associated with tokens paid to Payee B at step 316. The transaction details can identify Payee B as a payee and an amount of tokens provided to Payee B. Many variations are possible.

Figure 4:
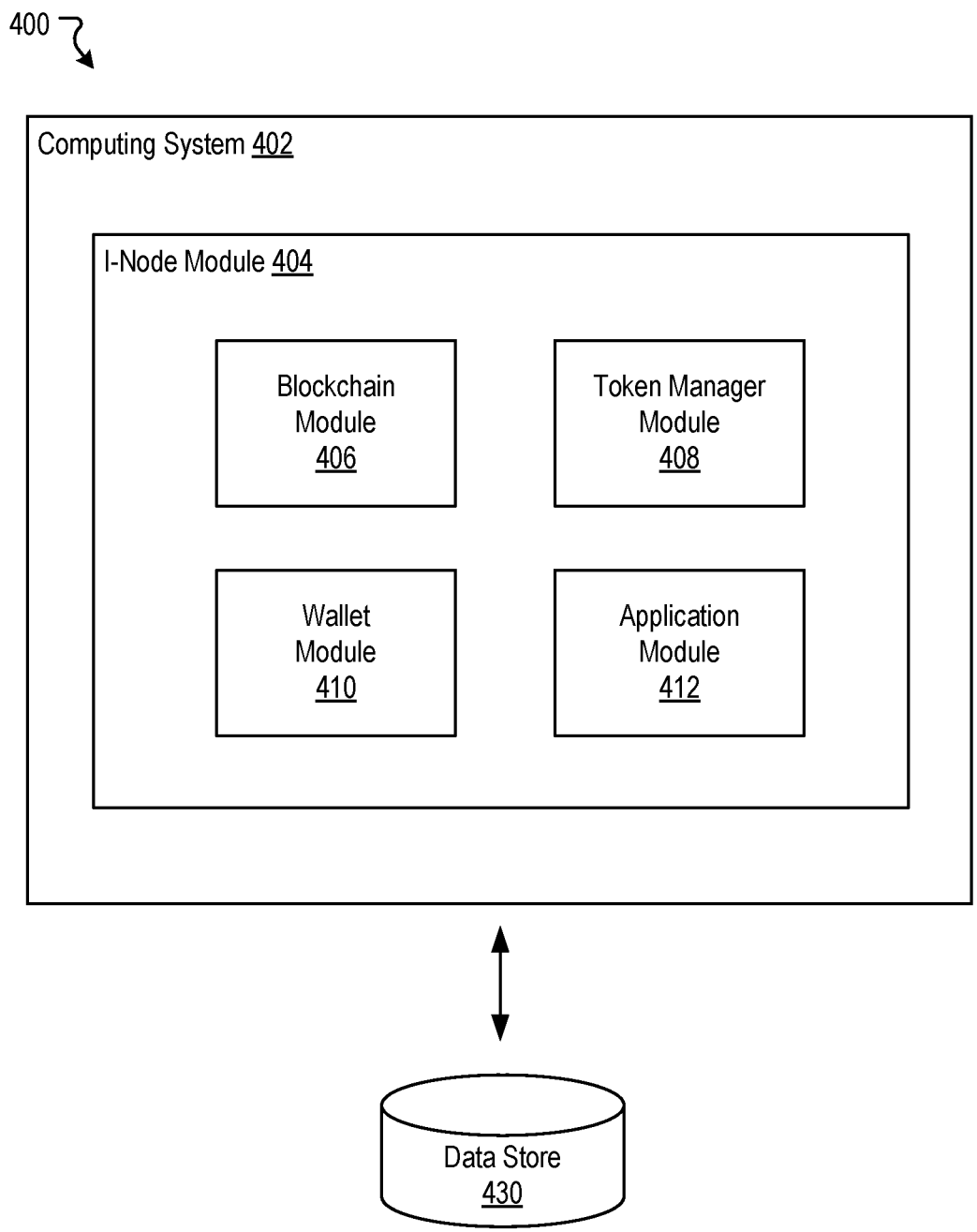
FIG. 4 illustrates an example computing system implementing an I-Node module, in accordance with various embodiments of the present technology.

FIG. 4 illustrates an example environment 400, in accordance with various embodiments. The example environment 400 can include at least a computing system 402. The computing system 402 can include one or more processors and memory among other components, as described in reference to FIG. 8. The processors can be configured to perform various operations by interpreting machine-readable instructions. The computing system 402 can include an I-Node module 404. The I-Node module 404 can include a blockchain module 406, a token manager module 408, a wallet module 410, and an application module 412. The blockchain module 406, token manager module 408, wallet module 410, and application module 412 can be executed by the processor(s) of the computing system 402 to perform various operations, as described below. In some embodiments, the I-Node module 404 can be implemented, in whole or in part, as software that is capable of running on one or more computing systems or devices. In some embodiments, the I-Node module 404 can be implemented, in whole or in part, as software that is capable of running on one or more servers (e.g., cloud servers). In some embodiments, the I-Node module 404 can be implemented, in whole or in part, as software that is capable of running on one or more virtual machines.

The computing system 402 can access a data store 430. In general, a data store may be any device in which data can be stored and from which data can be retrieved. In some embodiments, the data store 430 may store and manage various data, such as blockchain data, information describing blockchain protocols, encryption keys and algorithms, communication protocols and standards, data formatting standards and protocols, program code for modules and application programs of the processing device, and other data that may be suitable for use by the I-Node module 404 to perform the functions disclosed herein. The computing system 402 can access the data store 430 either directly or over a computer network. The computer network may be any wired or wireless network through which data can be sent and received (e.g., the internet, local area network, etc.).

The I-Node module 404 can interact with the computing system 402 to send and receive data over one or more networks based on one or more network protocols. For example, the I-Node module 404 can be configured to exchange data (e.g., receive data, send data) with other I-Nodes, T-Nodes, U-Nodes, financial institutions, blockchain networks, and other entities over computer networks, such as the internet. The I-Node module 404 can also be configured to exchange (e.g., send, receive) blockchain data, for example, with other I-Nodes, T-Nodes, and blockchain networks. The blockchain data may comprise a blockchain and associated data records included in the blockchain. For example, a blockchain data record can describe a blockchain transaction between network participants. The data record can include information, such as a transaction description (e.g., transaction date, sender address, destination address, transaction amount), entity information (e.g., entity name, wallet address, etc.), loan details (e.g., principal amount, interest rate, maturity date, etc.), payment purpose, recipient, project, among other information, such as smart contracts associated with the blockchain transaction. The I-Node module 404 can store such blockchain data in the data store 430.

The blockchain module 406 can be configured to manage one or more blockchains based on various blockchain protocols. In general, the blockchain module 406 can implement generally known blockchain protocols. A blockchain protocol can define a set of rules for managing a blockchain associated with a blockchain network. For example, the blockchain module 406 can implement a blockchain protocol that facilitates transactions based on cryptocurrency (e.g., tokens, coins, stablecoins). The blockchain may be configured to store a plurality of data records using a suitable data storage format and schema. The blockchain may be formatted based on generally known approaches. For example, the blockchain can be stored as a relational database that utilizes structured query language to process structured data sets stored therein. Each data record stored in the blockchain can be associated with a transaction and include blockchain data associated therewith, such as a transaction description (e.g., transaction date, sender address, destination address, transaction amount), entity information (e.g., entity name, wallet address, etc.), loan details (e.g., principal amount, interest rate, maturity date, etc.), payment purpose, recipient, project, among other information as known to persons having skill in the relevant art. As an example, the blockchain can be used to record transactions relating to digital loans provided by some entity, such as a financial institution. In such embodiments, the blockchain can be managed based on a blockchain protocol associated with the financial institution. Further, the transactions can be based on cryptocurrency that is managed (e.g., minted, burned) by the financial institution. In other embodiments, digital loan transactions involving various entities (or financial institutions) can be based on a universal blockchain protocol. Further, the transactions can be based on cryptocurrency that is managed (e.g., minted, burned) by a hosted blockchain network platform or a banking consortium, for example.

The blockchain module 406 can be configured to query a blockchain. For example, the blockchain module 406 can query a blockchain for transaction details based on terms associated with a search query. For example, the blockchain module 406 can execute queries to retrieve (or identify) blockchain data representing various transactions based on various search criteria. In some embodiments, the blockchain module 406 can restrict which entities are permitted to submit such queries. For example, in some embodiments, only a lender associated with a blockchain-based digital loan payment network is permitted to query the blockchain for transactions involving tokens loaned by the lender. Many variations are possible.

The blockchain module 406 can be configured to generate data records to be stored in a blockchain based on a blockchain protocol. The data record may be a data record suitable for inclusion in the blockchain and include data suitable for use in validation of a given transaction. The included data may comprise transaction data values. In some embodiments, one or more of the transaction data values included in the generated data record may be hashed and/or encrypted using one or more suitable hashing and encryption algorithms, respectively.

The blockchain module 406 can update a blockchain based on generated data records. For example, the blockchain module 406 can determine that a new transaction has occurred. In this example, the blockchain module 406 can execute a query to update the blockchain to add a data record associated with the new transaction. In some instances, the blockchain may be stored locally, such as a blockchain stored in the data store 430. In other instances, the blockchain may be associated with a blockchain network. In such instances, when the blockchain is updated with a generated data record, the generated data record can be submitted to the blockchain network and/or one or more nodes associated with the blockchain network for validation and/or posting to the blockchain. In some embodiments, the blockchain module 406 can provide (or broadcast) a notification, for example, to other modules of the I-Node module 404 or nodes in the blockchain network, once the blockchain is updated.

The blockchain module 406 can be configured to verify (or validate) data records to be stored in a blockchain. For example, the blockchain module 406 may receive a data record to be added to a blockchain. The data record can describe a transaction. The blockchain module 406 may be configured to validate the data record using one or more suitable methods, such as a proof of work method associated with the corresponding blockchain including, for example, proof of stake calculations and confirmations, proof of authority calculations and confirmations, proof of history calculations and confirmations, proof of two calculations and confirmations, and proof of N calculations and confirmations, to name some examples. The blockchain module 406 can also output an indication of success or failure for the validation. For example, if the validation of the data record is successful, the blockchain module 406 may indicate that validation of the data record was completed successfully. As a result, the data record can be added to the blockchain and propagated or broadcasted to nodes of a corresponding blockchain network. The blockchain module 406 can also send a notification to the corresponding blockchain network and/or one or more nodes in the corresponding blockchain network to indicate the successful validation of the data record. Many variations are possible.

The blockchain module 406 can be configured to electronically transmit data to a blockchain network for posting new blockchain transactions to a blockchain. In some embodiments, the blockchain module 406 can electronically transmit data to different blockchain networks. In such embodiments, the blockchain module 406 can identify a blockchain network to which data is to be transmitted based on a network identifier associated with the blockchain network as provided in blockchain data (e.g., data records). In some embodiments, the blockchain module 406 can also be configured to transmit validation data to the blockchain network and to nodes associated with the blockchain network. For example, the validation data can be transmitted for data records newly added to the blockchain associated with the blockchain network.

The token manager module 408 can be configured to manage payment loan tokens that can be used to conduct transactions. For example, the token manager module 408 can be configured to exchange fiat or digital currency for cryptocurrency tokens, minting new tokens as needed, and burning previously used tokens as necessary. In some embodiments, tokens minted by the token manager module 408 are pegged to a fiat currency (e.g., U.S. dollars). As an example, a single token can be pegged to a single U.S. dollar. In such embodiments, an entity (e.g., a financial institution) that controls a computing node implementing the I-Node module 404 can allocate fiat or digital currency (e.g., US Dollars) in an amount consistent with or less than an amount of tokens to be minted. The minted tokens can be stored in a digital wallet and be used by the entity to provide digital loans based on the minted tokens. The fiat or digital currency can be stored in an account (e.g., bank account, escrow account) associated with the financial institution. In some embodiments, the financial institution can process requests to redeem (e.g., exchange, cash out) tokens from entities that received a digital loan token from the financial institution. For example, a computing system associated with the financial institution can process requests to redeem tokens from payees of a borrower.

The token manager module 408 can be configured to mint different types of tokens depending on the implementation. For example, in an embodiment, the token manager module 408 can mint lender-specific tokens. That is, the token manager module 408 mint tokens that are specific to a financial institution (e.g., Financial Institution A, Financial Institution B, etc.). In this embodiment, borrowers can use the minted tokens to repay any loans provided by the financial institution. Further, payees can exchange lender-specific tokens for fiat currency through the financial institution. In another embodiment, the token manager module 408 can mint loan-specific tokens. That is, the token manager module 408 mint tokens that are specific to a loan provided by a financial institution. In this embodiment, a borrower that received the loan from the financial institution can use loan-specific tokens to repay the loan provided by the financial institution. Further, payees can exchange loan-specific tokens for fiat currency through the financial institution. In yet another embodiment, the token manager module 408 can mint universal tokens that are accepted by the financial institution. In such embodiments, other lenders can also mint and accept the universal tokens. In this embodiment, borrowers can use universal tokens to repay any loans regardless of lender. Further, payees can exchange universal tokens for fiat currency through any lender. Many variations are possible. In some embodiments, the token manager module 408 can mint special purpose tokens that facilitate transactions that relate to a specified purpose. In some embodiments, the token manager module 408 can mint industry-specific tokens that facilitate transactions between entities associated with a particular industry. In some embodiments, the token manager module 408 can mint geographic-specific tokens that facilitate transactions between entities associated with a particular geographic region. In some embodiments, the token manager module 408 can mint country-specific tokens that facilitate transactions between entities associated with a particular country. In some embodiments, the token manager module 408 can mint project-specific tokens that facilitate transactions between entities associated with a particular project. In some embodiments, the token manager module 408 can mint lender-agnostic tokens that can be used to facilitate transactions between entities regardless of lender.

The wallet module 410 can be configured to manage one or more digital wallets associated with a given entity (e.g., a financial institution). The digital wallets can be implemented using generally known approaches for storing and managing payment loan tokens. For example, in various embodiments, the wallet module 410 can provide options to send tokens to participants in a blockchain network and receive tokens from participants in the blockchain network. In some embodiments, the wallet module 410 provides an option to redeem (or cash out) tokens stored in a digital wallet for fiat or digital currency. For example, a network participant can interact with the wallet module 410 to request that some amount of tokens be converted to fiat or digital currency. In this example, the wallet module 410 can determine an amount of fiat or digital currency to be withdrawn from an account at a financial institution based on the amount of tokens to be converted. The wallet module 410 can provide a request to withdraw the amount of fiat or digital currency from the account to a computing system associated with the financial institution. The computing system associated with the financial institution can provide an electronic payment to the network participant in response to the request to withdraw. The converted tokens can be burned as part of the withdrawal. In some embodiments, the wallet module 410 can be implemented as a software application that can run on computing devices.

The application module 412 can be configured to apply blockchain data for various applications. For example, in some embodiments, the application module 412 can create and evaluate smart contracts based on generally known approaches. A smart contract can involve transactions involving multiple entities in a blockchain network. The application module 412 can provide various options to construct and evaluate smart contracts. For example, a smart contract can be written as computer code that is committed to a blockchain. The smart contract can be associated with conditions. When an event described in the smart contract is triggered, the computer code associated with the smart contract can execute. As an example, a smart contract may be created between a financial institution and a borrower. The smart contract can be associated with a condition that requires the borrower to electronically sign for a digital loan before the financial institution provides tokens to a digital wallet associated with the borrower. Many variations are possible. In various embodiments, a smart contract can be programmed to process digital loan tokens when one or more conditions are satisfied. For example, a smart contract can be associated with a condition that requires use of digital loan tokens for a specified purpose. In another example, a smart contract can be associated with a condition that requires use of digital loan tokens for a specified project. In yet another example, a smart contract can be associated with a condition that requires use of digital loan tokens for a specified payee.

The application module 412 can be configured to generate a digital loan report. For example, the application module 412 can query a blockchain to identify digital loan transactions. The identified transactions can be used to generate a report that identifies various transaction information, such as transaction descriptions (e.g., transaction date, sender address, destination address, transaction amount), loan details (e.g., principal amount, interest rate, maturity date, etc.), and entity information (e.g., entity name, wallet address, etc.), payment purpose, recipient, project, for example. The report can thus identify payments made from one entity to another entity. For example, the report can identify digital loan details processed by a financial institution for a borrower. In another example, the report can identify digital payments from the borrower to payees. In yet another example, the report can identify digital loan payments from the borrower to the financial institution, such as payments towards loan interest and/or principal. In such embodiments, the financial institution can readily identify digital loan borrowers and payees based on transactions conducted by those borrowers and payees based on payment loan tokens.

The application module 412 can be configured to trace payments involving tokens associated with a given digital loan. For example, the application module 412 can trace tokens associated with a digital loan made to a borrower and payments involving those tokens from the borrower to payees. In some embodiments, the application module 412 can query a blockchain to identify transactions associated with a given digital loan. The identified transactions can be analyzed to trace circulation of tokens associated with the digital loan in a blockchain network. In some embodiments, the application module 412 can trace tokens based on a digital loan report, as described above.

The application module 412 can be configured to disable token redemption. For example, a lender can provide a borrower with tokens associated with a digital loan. The borrower can use the tokens to pay others. In some instances, the borrower may default on loan obligations. For instance, the borrower may fail to make a loan payment. In such instances, the application module 412 can be configured to limit the lender's losses by preventing entities from cashing out tokens associated with the digital loan. The application module 412 can also be configured to limit the lender's losses by preventing entities from making payments to payees. In some embodiments, the application module 412 can disable all tokens associated with the digital loan that are in the borrower's possession. Other approaches are possible. For example, in some embodiments, the application module 412 can disable all tokens associated with the digital loan that are in circulation regardless of which entity possesses the tokens. In some embodiments, the application module 412 can only disable tokens associated with the digital loan that have not been repaid.

The application module 412 can be configured to recover lost (e.g., misplaced, deleted, inaccessible, etc.) loan tokens. For example, when an entity loses access to a digital wallet, a blockchain that manages transactions involving the loan tokens can be queried to determine a token balance associated with the digital wallet and information describing the lost loan tokens. The lost loan tokens can be identified based on the queried information. The lost loan tokens can automatically be transferred to a lender that provided the lost loan tokens. The lender can burn the lost loan tokens. The application module 412 can then facilitate minting replacement tokens and transferring the replacement tokens to a replacement digital wallet associated with the entity. Many variations are possible.

Figure 5:
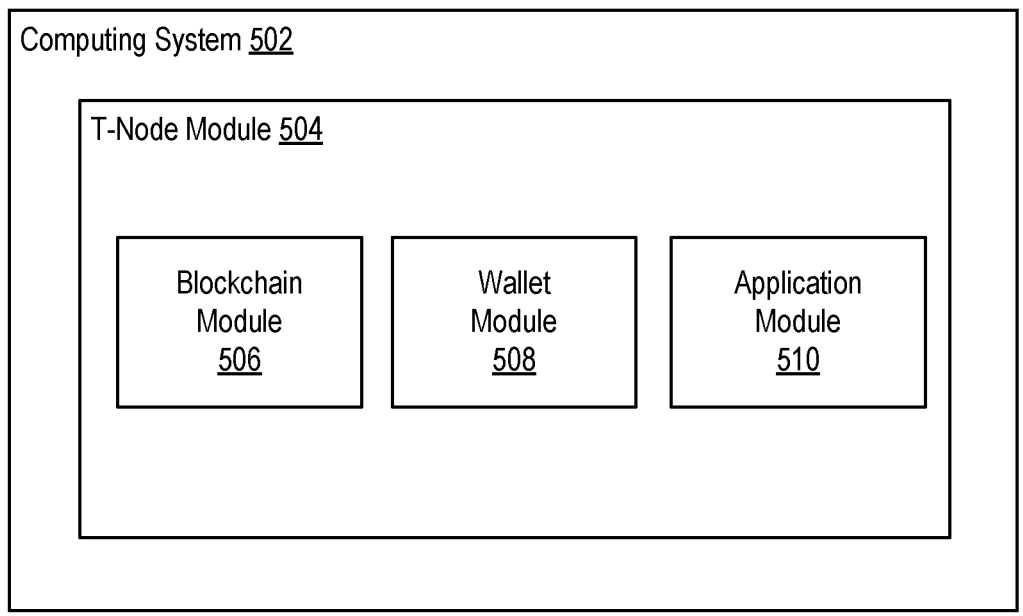
FIG. 5 illustrates an example computing system implementing a T-Node module, in accordance with various embodiments of the present technology.
Figure 5:
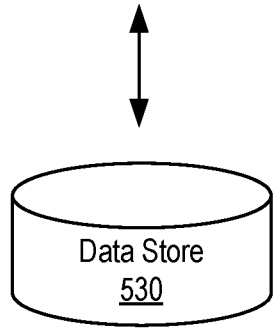

FIG. 5 illustrates an example environment 500, in accordance with various embodiments. The example environment 500 can include at least a computing system 502. The computing system 502 can include one or more processors and memory among other components, as described in reference to FIG. 8. The processors can be configured to perform various operations by interpreting machine-readable instructions. The computing system 502 can include a T-Node module 504. The T-Node module 504 can include a blockchain module 506, a wallet module 508, and an application module 510. The blockchain module 506, wallet module 508, and application module 510 can be executed by the processor(s) of the computing system 502 to perform various operations, as described below. In some embodiments, the T-Node module 504 can be implemented, in whole or in part, as software that is capable of running on one or more computing systems or devices. In some embodiments, the T-Node module 504 can be implemented, in whole or in part, as software that is capable of running on one or more servers (e.g., cloud servers). In some embodiments, the T-Node module 504 can be implemented, in whole or in part, as software that is capable of running on one or more virtual machines.

The computing system 502 can access a data store 530. In general, a data store may be any device in which data can be stored and from which data can be retrieved. In some embodiments, the data store 530 may store and manage various data, such as blockchain data, information describing blockchain protocols, encryption keys and algorithms, communication protocols and standards, data formatting standards and protocols, program code for modules and application programs of the processing device, and other data that may be suitable for use by the T-Node module 504 to perform the functions disclosed herein. The computing system 502 can access the data store 530 either directly or over a computer network. The computer network may be any wired or wireless network through which data can be sent and received (e.g., the Internet, local area network, etc.).

The T-Node module 504 can interact with the computing system 502 to send and receive data over one or more networks based on one or more network protocols. For example, the T-Node module 504 can be configured to exchange data (e.g., receive data, send data) with other I-Nodes, T-Nodes, U-Nodes, financial institutions, blockchain networks, and other entities over computer networks, such as the Internet. The T-Node module 504 can also be configured to exchange (e.g., send, receive) blockchain data, for example, with other I-Nodes, T-Nodes, and blockchain networks. The blockchain data may comprise a blockchain and associated data records included in the blockchain. For example, a blockchain data record can describe a blockchain transaction between network participants. The data record can include information, such as a transaction description (e.g., transaction date, sender address, destination address, transaction amount), entity information (e.g., entity name, wallet address, etc.), loan details (e.g., principal amount, interest rate, maturity date, etc.), payment purpose, recipient, project, among other information, such as smart contracts associated with the blockchain transaction. The T-Node module 504 can store such blockchain data in the data store 530.

The blockchain module 506 can be configured to manage one or more blockchains based on various blockchain protocols. In general, the blockchain module 506 can implement generally known blockchain protocols. A blockchain protocol can define a set of rules for managing a blockchain associated with a blockchain network. For example, the blockchain module 506 can implement a blockchain protocol that facilitates transactions based on cryptocurrency (e.g., tokens, coins, stablecoins). The blockchain may be configured to store a plurality of data records using a suitable data storage format and schema. The blockchain may be formatted based on generally known approaches. For example, the blockchain can be stored as a relational database that utilizes structured query language to process structured data sets stored therein. Each data record stored in the blockchain can be associated with a transaction and include blockchain data associated therewith, such as a transaction description (e.g., transaction date, sender address, destination address, transaction amount), entity information (e.g., entity name, wallet address, etc.), loan details (e.g., principal amount, interest rate, maturity date, etc.), payment purpose, recipient, project, among other information as known to persons having skill in the relevant art. As an example, the blockchain can be used to record transactions relating to digital loans provided by some entity, such as a financial institution. In such embodiments, the blockchain can be managed based on a blockchain protocol associated with the financial institution. Further, the transactions can be based on cryptocurrency that is managed (e.g., minted, burned) by the financial institution. Many variations are possible. In various embodiments, the blockchain module 506 can support different blockchains for different lenders. For example, the blockchain module 506 can manage a first blockchain that records digital loan transactions associated with a first lender and a second blockchain that records digital loan transactions associated with a second lender.

The blockchain module 506 can be configured to query a blockchain. For example, the blockchain module 406 can query a blockchain for transaction details based on terms associated with a search query. For example, the blockchain module 506 can execute queries to retrieve (or identify) blockchain data representing various transactions based on various search criteria. In some embodiments, the blockchain module 506 can restrict which entities are permitted to submit such queries. For example, in some embodiments, only a lender associated with a blockchain-based digital loan payment network is permitted to query the blockchain for transactions involving tokens loaned by the lender. Many variations are possible.

The blockchain module 506 can be configured to generate data records to be stored in a blockchain based on a blockchain protocol. The data record may be a data record suitable for inclusion in the blockchain and include data suitable for use in validation of a given transaction. The included data may comprise transaction data values. In some embodiments, one or more of the transaction data values included in the generated data record may be hashed and/or encrypted using one or more suitable hashing and encryption algorithms, respectively.

The blockchain module 506 can update a blockchain based on generated data records. For example, the blockchain module 506 can determine that a new transaction has occurred. In this example, the blockchain module 506 can execute a query to update the blockchain to add a data record associated with the new transaction. In some instances, the blockchain may be stored locally, such as a blockchain stored in the data store 530. In other instances, the blockchain may be associated with a blockchain network. In such instances, when the blockchain is updated with a generated data record, the generated data record can be submitted to the blockchain network and/or one or more nodes associated with the blockchain network for validation and posting to the blockchain. In some embodiments, the blockchain module 506 can provide (or broadcast) a notification, for example, to other modules of the T-Node module 504 or nodes in the blockchain network, once the blockchain is updated.

The blockchain module 506 can be configured to verify (or validate) data records to be stored in a blockchain. For example, the blockchain module 506 may receive a data record to be added to a blockchain. The data record can describe a transaction. The blockchain module 506 may be configured to validate the data record using one or more suitable methods, such as a proof of work method associated with the corresponding blockchain including, for example, proof of stake calculations and confirmations, proof of authority calculations and confirmations, proof of history calculations and confirmations, proof of two calculations and confirmations, and proof of N calculations and confirmations, to name some examples. The blockchain module 506 can also output an indication of success or failure for the validation. For example, if the validation of the data record is successful, the blockchain module 506 may indicate that validation of the data record was completed successfully. As a result, the data record can be added to the blockchain and propagated or broadcasted to nodes of a corresponding blockchain network. The blockchain module 506 can also send a notification to the corresponding blockchain network and/or one or more nodes in the corresponding blockchain network to indicate the successful validation of the data record. Many variations are possible.

The blockchain module 506 can be configured to electronically transmit data to a blockchain network for posting new blockchain transactions to the blockchain. In some embodiments, the blockchain module 506 can electronically transmit data to different blockchain networks. In such embodiments, the blockchain module 506 can identify a blockchain network to which data is to be transmitted based on a network identifier associated with the blockchain network as provided in blockchain data (e.g., data records). In some embodiments, the blockchain module 506 can also be configured to transmit validation data to the blockchain network and to nodes associated with the blockchain network. For example, the validation data can be transmitted for data records newly added to the blockchain associated with the blockchain network.

In some embodiments, the blockchain module 506 can be configured to manage a unified blockchain associated with a blockchain network. The blockchain can be used to record transactions that occur in different blockchain-based digital loan payment networks. That is, the blockchain supports transactions based on different types of payment loan tokens that are minted for circulation in different blockchain-based digital loan payment networks. For example, the blockchain can be used to record transactions that occur in a first blockchain-based digital loan payment network associated with Financial Institution A and a second blockchain-based digital loan payment network associated with Financial Institution B. For example, the blockchain can support transactions that involve payments based on payment loan tokens minted by Financial Institution A (e.g., the I-Nodes 202) and transactions that involve payments based on payment loan tokens minted by Financial Institution B (e.g., the I-Nodes 222). In some embodiments, the blockchain associated with the blockchain network can be a "private" blockchain that is restricted to Financial Institution A and/or Financial Institution B, including borrowers and payees. In some embodiments, the nodes of the blockchain network can be configured to post blockchain transactions to the blockchain. The nodes can also be configured to validate transactions posted to the blockchain. In general, transactions posted to the blockchain can be validated using generally known techniques including, for example, proof of work calculations and confirmations, proof of stake calculations and confirmations, proof of authority calculations and confirmations, proof of history calculations and confirmations, proof of two calculations and confirmations, and proof of N calculations and confirmations, to name some examples. In some embodiments, the blockchain is hosted by a blockchain-based digital loan network. In such embodiments, the blockchain can be managed exclusively by the blockchain-based digital loan network. For example, in such embodiments, the T-Node module 504 can be implemented in one or more computer nodes that are managed by the blockchain-based digital loan network.

The wallet module 508 can be configured to manage one or more digital wallets associated with a given entity (e.g., financial institution). The digital wallets can be implemented using generally known approaches for storing and managing payment loan tokens. For example, in various embodiments, the wallet module 508 can provide options to send tokens to participants in a blockchain network and receive tokens from participants in the blockchain network. In some embodiments, the wallet module 508 provides an option to redeem (or cash out) tokens stored in a digital wallet for fiat or digital currency. For example, a network participant can interact with the wallet module 508 to request that some amount of tokens be converted to fiat or digital currency. In this example, the wallet module 508 can determine an amount of fiat or digital currency to be withdrawn from an account at a financial institution based on the amount of tokens to be converted. The wallet module 508 can provide a request to withdraw the amount of fiat or digital currency from the account to a computing system associated with the financial institution. The computing system associated with the financial institution can provide an electronic payment to the network participant in response to the request to withdraw. The converted tokens can be burned as part of the withdrawal. In some embodiments, the wallet module 508 can be implemented as a software application that can run on computing devices. Many variations are possible. In some embodiments, the wallet module 508 can be implemented as a software application that can run on computing servers. In some embodiments, the wallet module 508 can implement a multi-token digital wallet that is capable of managing cryptocurrency tokens associated with different blockchain-based digital loan payment networks.

The application module 510 can be configured to use blockchain data for various applications. For example, in some embodiments, the application module 510 can create and evaluate smart contracts based on generally known approaches. A smart contract can involve transactions involving multiple entities in a blockchain network. The application module 510 can provide various options to construct and evaluate smart contracts. For example, a smart contract can be written as computer code that is committed to a blockchain. The smart contract can be associated with conditions. When an event described in the smart contract is triggered, the computer code associated with the smart contract can execute. As an example, a smart contract may be created between a financial institution and a borrower. The smart contract can be associated with a condition that requires the borrower to electronically sign for a digital loan before the financial institution provides tokens to a digital wallet associated with the borrower. Many variations are possible. In various embodiments, a smart contract can be programmed to process digital loan tokens when one or more conditions are satisfied. For example, a smart contract can be associated with a condition that requires use of digital loan tokens for a specified purpose. In another example, a smart contract can be associated with a condition that requires use of digital loan tokens for a specified project. In yet another example, a smart contract can be associated with a condition that requires use of digital loan tokens for a specified payee.

The application module 510 can be configured to generate a digital loan report. For example, the application module 510 can query a blockchain to identify digital loan transactions. The identified transactions can be used to generate a report that identifies various transaction information, such as transaction descriptions (e.g., transaction date, sender address, destination address, transaction amount), loan details (e.g., principal amount, interest rate, maturity date, etc.), and entity information (e.g., entity name, wallet address, etc.), payment purpose, recipient, project, for example. The report can thus identify payments made from one entity to another entity. For example, the report can identify digital loan details processed by a financial institution for a borrower. In another example, the report can identify digital payments from the borrower to payees. In yet another example, the report can identify digital loan payments from the borrower to the financial institution, such as payments towards loan interest and/or principal. In such embodiments, the financial institution can readily identify digital loan borrowers and payees based on transactions conducted by those borrowers and payees based on payment loan tokens.

Figure 6:
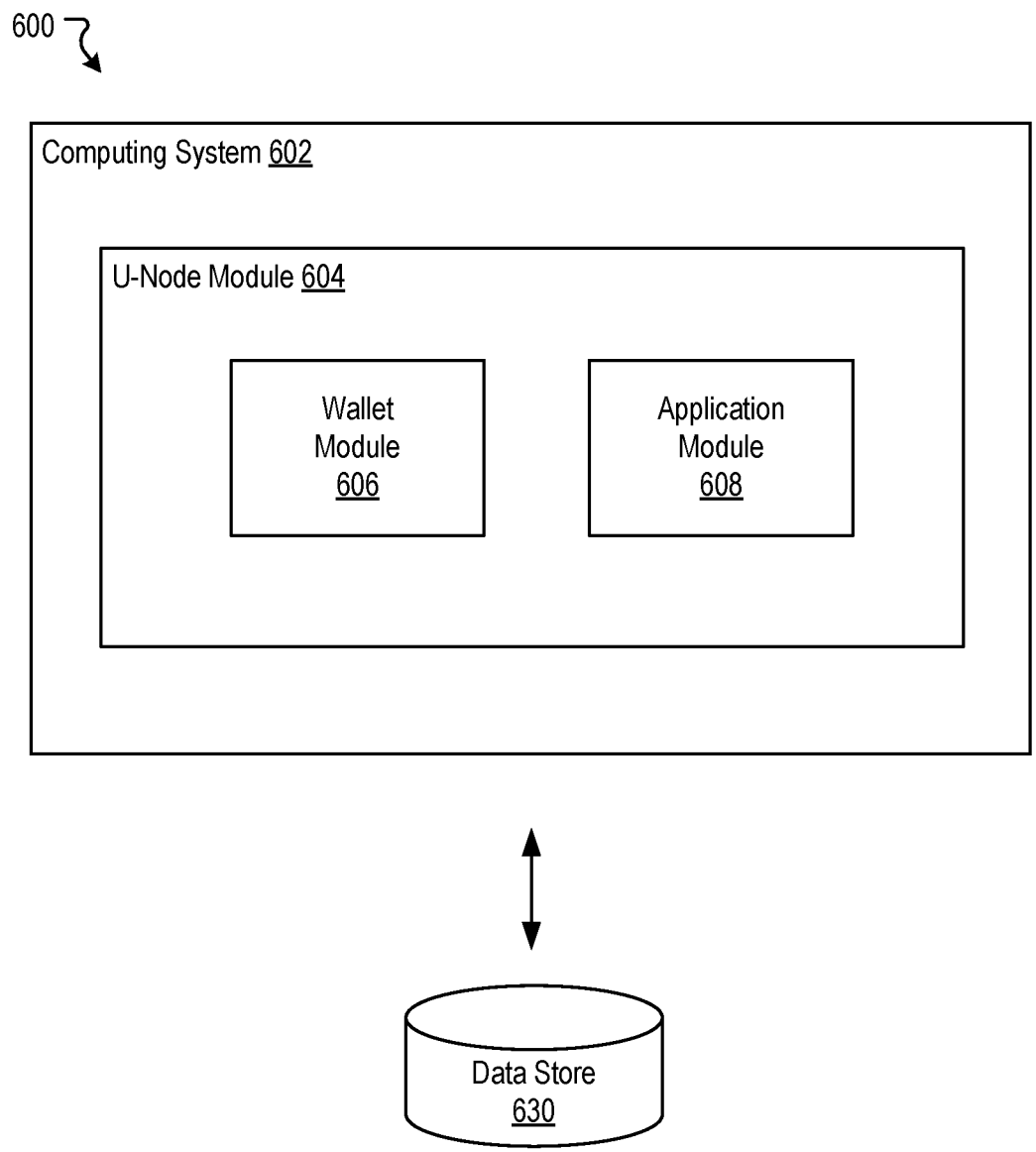
FIG. 6 illustrates an example computing system implementing a U-Node module, in accordance with various embodiments of the present technology.

FIG. 6 illustrates an example environment 600, in accordance with various embodiments. The example environment 600 can include at least a computing system 602. The computing system 602 can include one or more processors and memory among other components, as described in reference to FIG. 8. The processors can be configured to perform various operations by interpreting machine-readable instructions. The computing system 602 can include a U-Node module 604. The U-Node module 604 can include a wallet module 606 and an application module 608. The wallet module 606 and application module 608 can be executed by the processor(s) of the computing system 602 to perform various operations, as described below. In some embodiments, the U-Node module 604 can be implemented, in whole or in part, as software that is capable of running on one or more computing systems or devices. In some embodiments, the U-Node module 604 can be implemented, in whole or in part, as software that is capable of running on one or more servers (e.g., cloud servers).

The computing system 602 can access a data store 630. In general, a data store may be any device in which data can be stored and from which data can be retrieved. In some embodiments, the data store 630 may store and manage various data, such as blockchain data, information describing blockchain protocols, encryption keys and algorithms, communication protocols and standards, data formatting standards and protocols, program code for modules and application programs of the processing device, and other data that may be suitable for use by the U-Node module 604 to perform the functions disclosed herein. The computing system 602 can access the data store 630 either directly or over a computer network. The computer network may be any wired or wireless network through which data can be sent and received (e.g., the Internet, local area network, etc.).

The U-Node module 604 can interact with the computing system 602 to receive data over one or more networks based on one or more network protocols. For example, the U-Node module 604 can be configured to exchange data (e.g., receive data, send data) with other I-Nodes, T-Nodes, U-Nodes, financial institutions, blockchain networks, and other entities over computer networks, such as the internet. The U-Node module 604 can also be configured to receive blockchain data, for example, from other I-Nodes, T-Nodes, and blockchain networks. The blockchain data may comprise a blockchain and associated data records included in the blockchain. For example, a blockchain data record can describe a blockchain transaction between network participants. The data record can include information, such a transaction description (e.g., transaction date, sender address, destination address, transaction amount), entity information (e.g., entity name, wallet address, etc.), loan details (e.g., principal amount, interest rate, maturity date, etc.), payment purpose, recipient, project, among other information, such as smart contracts associated with the blockchain transaction. The U-Node module 604 can store such blockchain data in the data store 630.

The wallet module 606 can be configured to manage one or more digital wallets associated with an entity (e.g., a network participant). The digital wallets can be implemented using generally known approaches for storing and managing cryptocurrency and payment loan tokens. For example, in various embodiments, the wallet module 606 can provide options to send tokens to other entities in a blockchain network and receive tokens from other entities in the blockchain network. In some embodiments, the wallet module 606 provides an option to redeem (or cash out) tokens stored in a digital wallet for fiat or digital currency. For example, an entity can interact with the wallet module 606 to request that some amount of tokens be converted to fiat or digital currency. In this example, the wallet module 606 can determine an amount of fiat or digital currency to be withdrawn from an account at a financial institution based on the amount of tokens to be converted. The wallet module 606 can provide a request to withdraw the amount of fiat or digital currency from the account to a computing system associated with the financial institution. The computing system associated with the financial institution can provide an electronic payment to the network participant in response to the request to withdraw. The converted tokens can be burned as part of the withdrawal. Many variations are possible. In some embodiments, the wallet module 606 can be implemented as a software application that can run on computing devices. In some embodiments, the wallet module 606 can implement a multi-token digital wallet that is capable of managing cryptocurrency tokens associated with different blockchain-based digital loan payment networks.

The application module 608 can be configured to use blockchain data for various applications. For example, in some embodiments, the application module 608 can create and evaluate smart contracts based on generally known approaches. A smart contract can involve transactions involving multiple entities in a blockchain network. The application module 608 can provide various options to construct and evaluate smart contracts. For example, a smart contract can be written as computer code that is committed to a blockchain. The smart contract can be associated with conditions. When an event described in the smart contract is triggered, the computer code associated with the smart contract can execute. In various embodiments, a smart contract can be programmed to process digital loan tokens when one or more conditions are satisfied. For example, a smart contract can be associated with a condition that requires use of digital loan tokens for a specified purpose. In another example, a smart contract can be associated with a condition that requires use of digital loan tokens for a specified project. In yet another example, a smart contract can be associated with a condition that requires use of digital loan tokens for a specified payee.

Figure 7A:
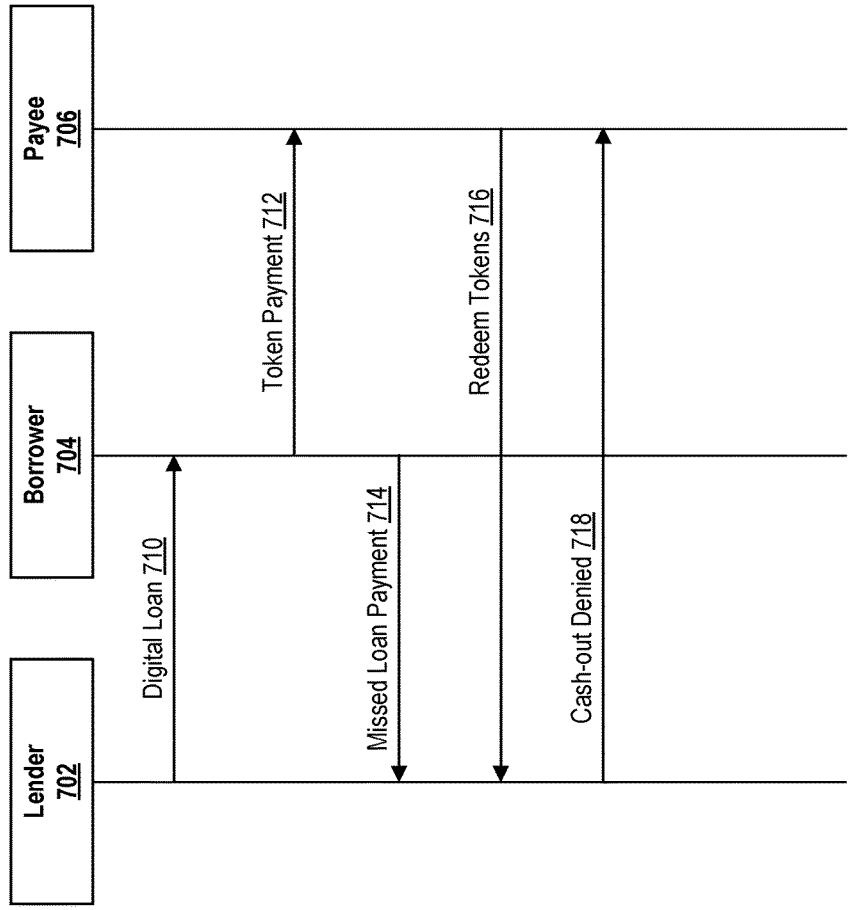
FIGS. 7A-7E illustrate example diagrams, in accordance with various embodiments of the present technology.

FIG. 7A illustrates an example sequence diagram 700, in accordance with various embodiments of the present technology. The example sequence diagram 700 illustrates an example set of interactions (or transactions) between a lender 702, borrower 704, and payee 706 through a blockchain-based digital loan payment network in accordance with various embodiments of the present technology. It should be appreciated that there can be additional, fewer, or alternative steps performed in similar or alternative orders, or in parallel, within the scope of the various embodiments unless otherwise stated.

For example, the lender 702 can mint cryptocurrency (or payment loan tokens) that can be used to conduct transactions within the blockchain-based digital loan payment network. The tokens can be pegged to fiat or digital currency that is deposited partially or fully in an account associated with the lender 702. The lender 702 can mint payment loan tokens based on the deposited fiat currency or loan amount. At step 710, the lender 702 can provide a digital loan to the borrower 704. The digital loan transaction can be recorded in a blockchain associated with the blockchain-based digital loan payment network, as described herein. At step 712, the borrower 704 makes a payment to payee 706 in the amount of 50 tokens. At step 714, the borrower 704 defaults on a loan payment to the lender 702 in accordance with the digital loan. As a result, the lender 702 can disable its cashing-out functionality in an effort to limit its losses from the default. For example, at step 716, the payee 706 attempts to exchange 50 tokens for fiat currency through the lender 702. At step 718, the lender 702 can deny the exchange request and can provide a response to the payee 706 indicating that cashing-out functionality is disabled. Many variations are possible.

Figure 7B:
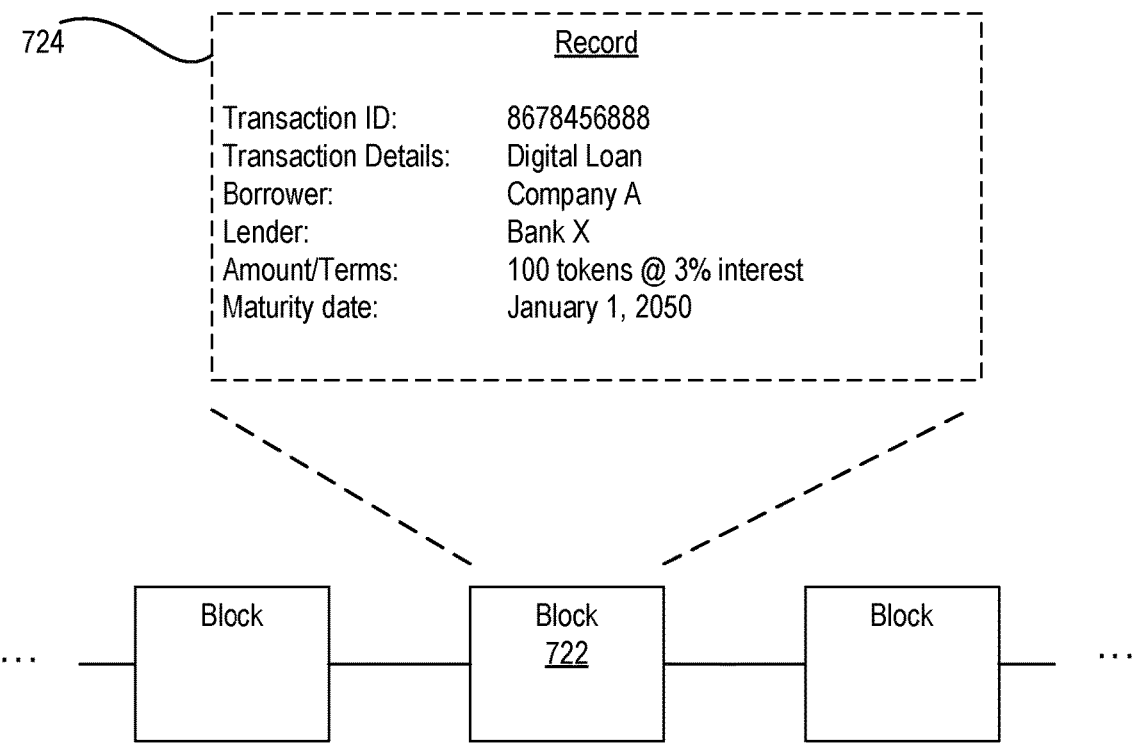

FIG. 7B illustrates a diagram of an example blockchain 720. The example blockchain 720 can include a number of cryptographically linked blocks. In the example of FIG. 7B, a block 722 includes an example data record 724 describing a digital loan transaction. The data record 724 includes various information describing the digital loan transaction including, for example, a transaction identifier, transaction details, a borrower, a lender, a principal amount associated with the digital loan, a count of tokens loaned, terms associated with the loan (e.g., interest rate, repayment terms, etc.), and a maturity date, to name some examples. Many variations are possible.

Figure 7C:
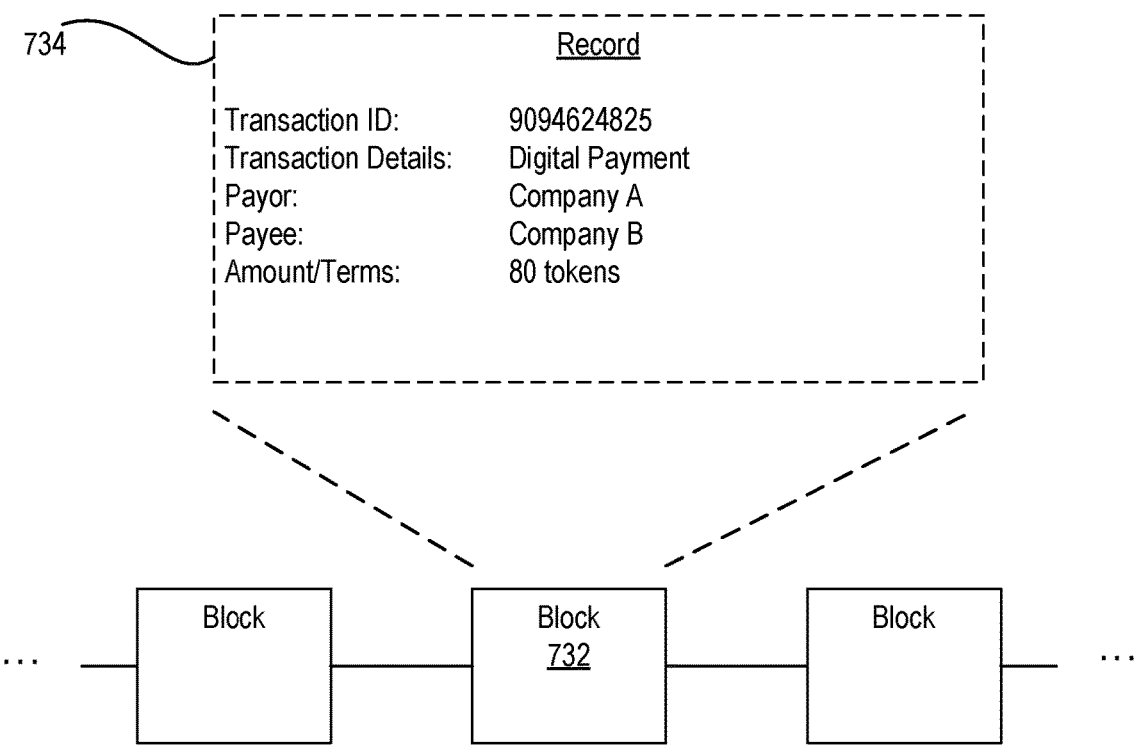

FIG. 7C illustrates another diagram of the example blockchain 720. In the example of FIG. 7C, a block 732 includes an example data record 734 describing a payment transaction made based on tokens associated with a digital loan. For example, the data record 734 can reflect a payment made from a borrower to a payee. The data record 734 includes various information describing the payment transaction including, for example, a transaction identifier, transaction details, a payor, a payee, and a count of tokens paid, to name some examples. Many variations are possible.

Figure 7D:
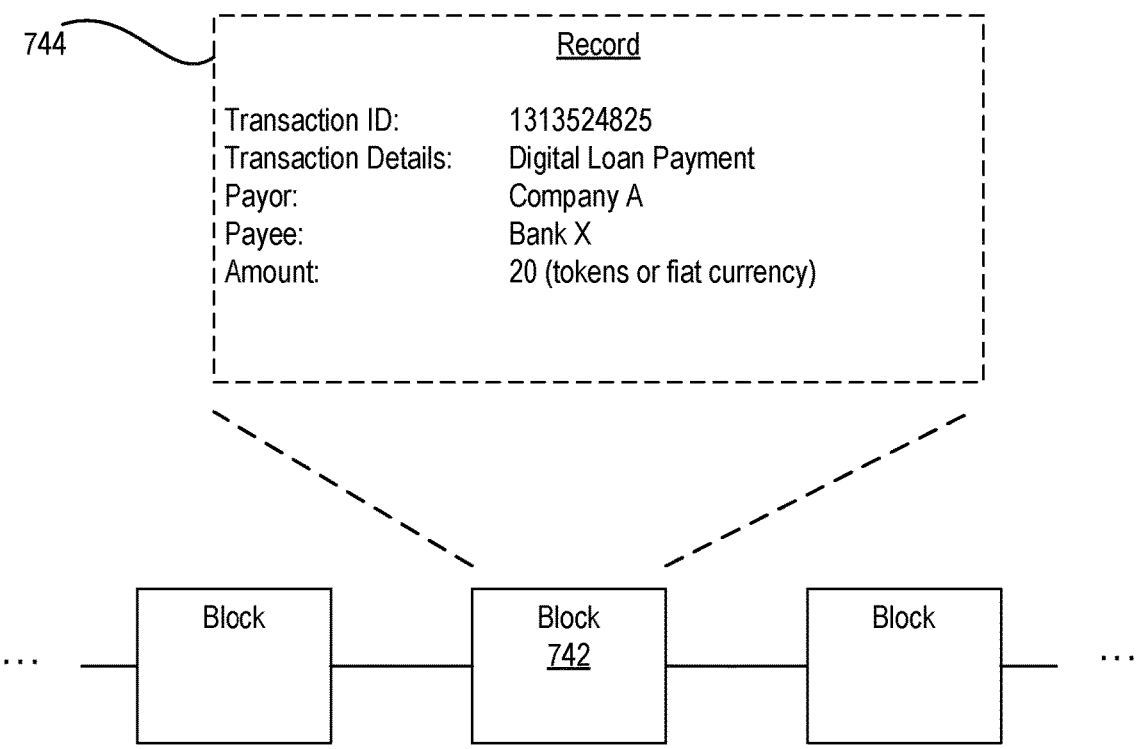

FIG. 7D illustrates yet another diagram of the example blockchain 720. In the example of FIG. 7D, a block 742 includes an example data record 744 describing a loan payment transaction for a digital loan. For example, the data record 744 can reflect a payment made from a borrower to a lender, such as a principal and/or interest payment. The data record 744 includes various information describing the payment transaction including, for example, a transaction identifier, transaction details, a payor, a payee, and a number of tokens paid, to name some examples. Many variations are possible.

Figure 7E:
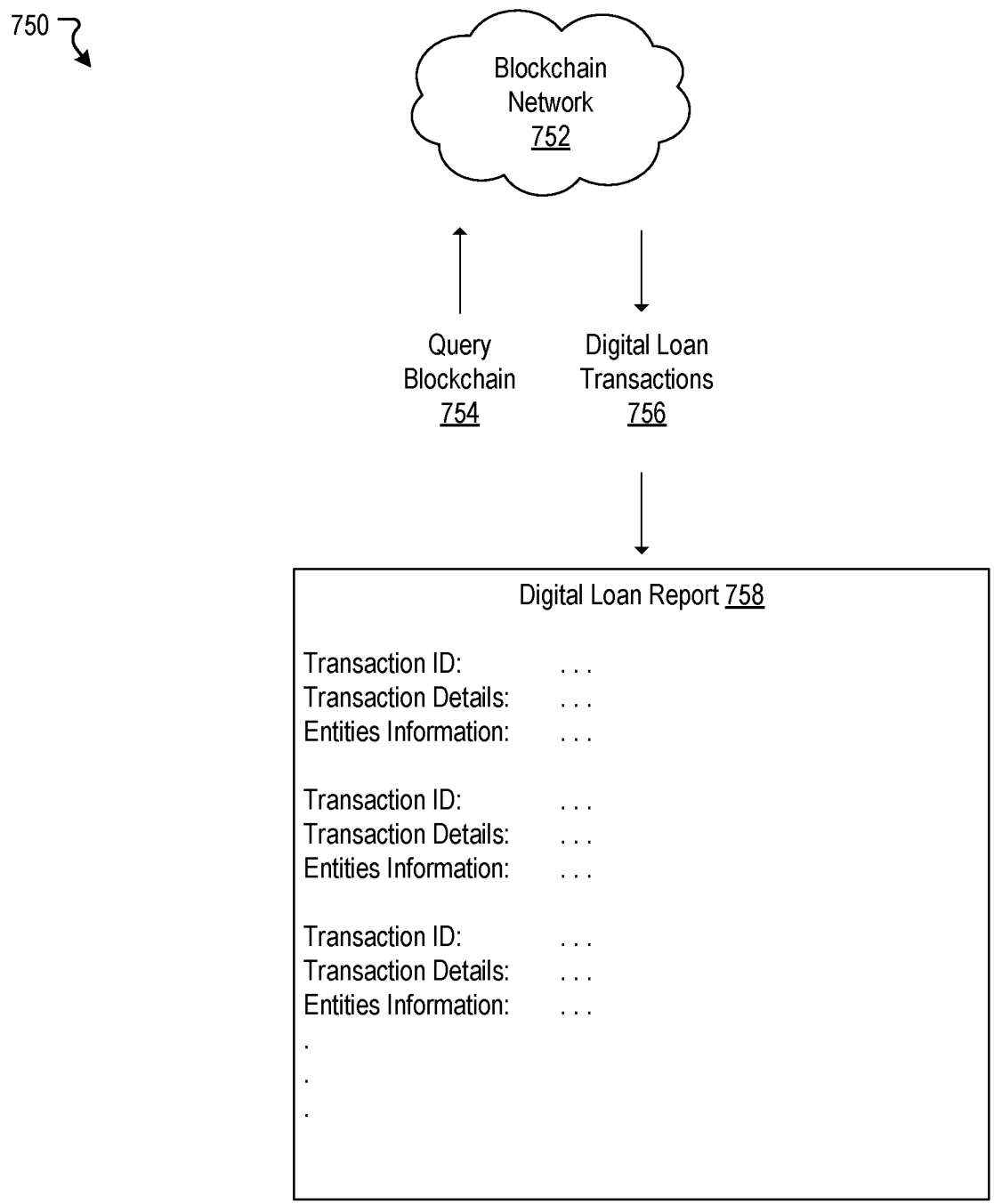

FIG. 7E illustrates an example diagram 750 for generating a digital loan report, in accordance with various embodiments of the present technology. In the example of FIG. 7E, a blockchain associated with a blockchain network 752 can be queried 754. The blockchain network 752 can comprise nodes associated with a blockchain-based digital loan payment network. A set of digital loan transactions 756 responsive to the query 754 can be obtained. The set of digital loan transactions 756 can describe various transactions that occurred between participants in the blockchain-based digital loan payment network. A digital loan report 758 can be generated based on the set of digital loan transactions 756. The digital loan report 758 can detail transactions that occurred between participants in the blockchain-based digital loan payment network, as described above. For example, the digital loan report 758 can identify network participants that received, sent, or redeemed payment loan tokens minted for circulation in the blockchain-based digital loan payment network. Many variations are possible.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
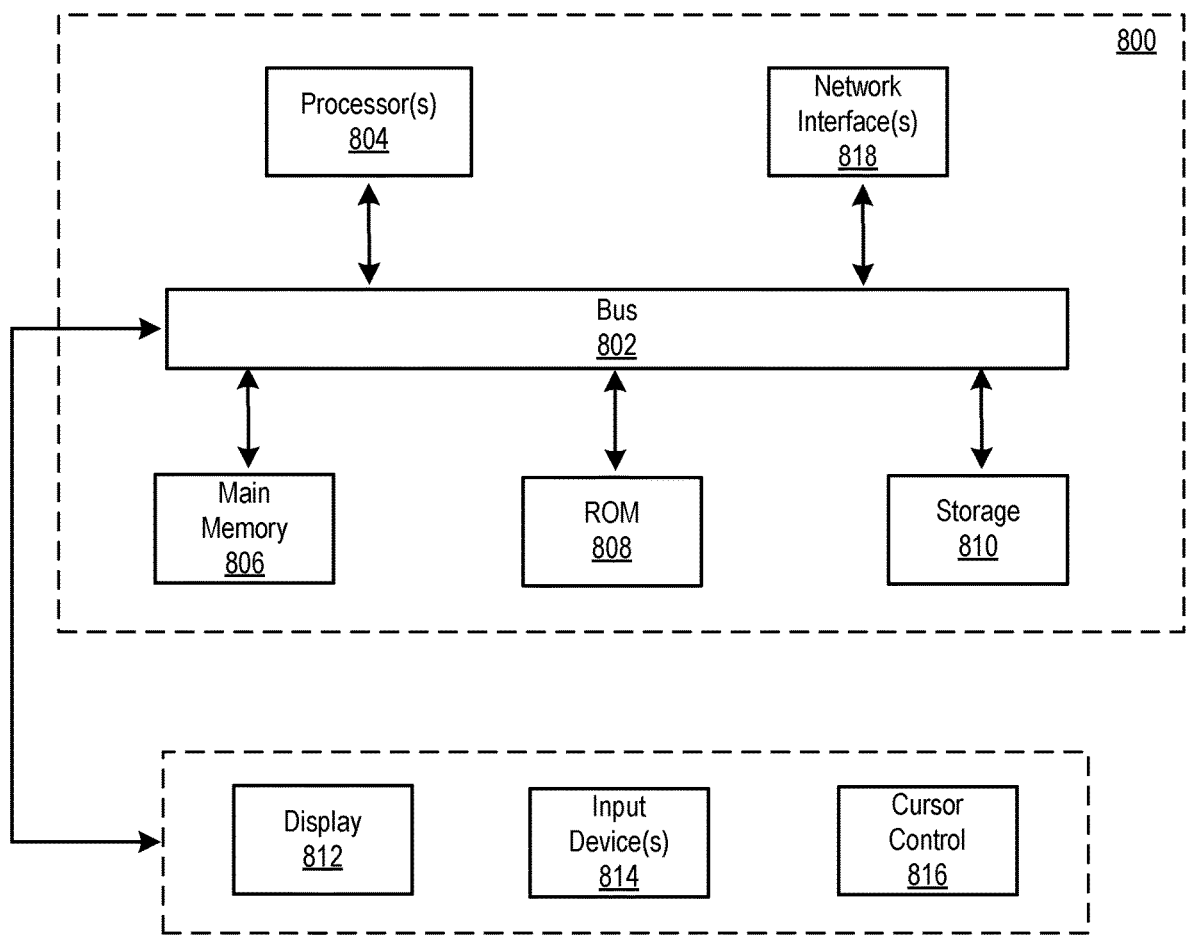
FIG. 8 illustrates a block diagram of an example computer system in which any of the embodiments described herein may be implemented.

FIG. 8 is a block diagram that illustrates a computer system 800 upon which any of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, Python, or GoLang. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieves and executes the instructions. The instructions received by main memory 806 may optionally be stored on storage device 810 either before or after execution by processor 804.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components (or modules), operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components (or modules) in example configurations may be implemented as a combined structure or component. Similarly, structures and functionality presented as a single component (or module) may be implemented as separate components (or modules). These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method for conducting digital loan payment transactions in a digital loan payment network of an entity based on a blockchain network, the method comprising:

minting, by an I-node in the blockchain network, payment loan tokens to conduct digital loan transactions within the digital loan payment network, the I-node being managed by the entity and participating as a node in the blockchain network of the entity, the I-node including at least one processor and memory, the payment loan tokens being pegged to fiat currency or digital currency, and the payment loan tokens being entity-specific tokens that are circulated in the digital loan payment network of the entity;

determining, by the I-node, a number of payment loan tokens to be provided to a borrower based on a digital loan transaction, wherein the borrower is a network participant associated with the digital loan payment network;

providing, by the I-node, a payment from a digital wallet associated with the I-node to a digital wallet associated with a U-node in the blockchain network, the U-node is associated with the borrower, the U-node including at least one processor and memory, and the payment being based on the number of payment loan tokens to be provided to the borrower based on the digital loan transaction, wherein payees that receive one or more payment loan tokens from the borrower can redeem the one or more payment loan tokens as fiat or digital currency through the I-node;

generating, by the I-node, a data record that represents the digital loan transaction associated with the payment from the I-node to the U-node; and providing, by the I-node, the data record to a T-node that participates as a node in the blockchain network, wherein the T-Node is one of a plurality of T-Nodes, each of the plurality of T-Nodes being provisioned by one of a plurality of banks each of which is a member of a common bank consortium, wherein the T-node posts the data record to a blockchain associated with the digital loan payment network hosted by the bank consortium.

2. The computer-implemented method of claim 1, further comprising:

determining, by the I-node, a request from a payee that received payment loan tokens from the borrower to convert one or more payment loan tokens to fiat or digital currency;

providing, by the I-node, instructions to a computing system associated with a financial institution to convert the one or more payment loan tokens to fiat or digital currency; and causing, by the I-node, the one or more payment loan tokens to be burned.

3. The computer-implemented method of claim 2, wherein fiat currency or digital currency that is pegged to the payment loan tokens is reduced based on the conversion of the one or more payment loan tokens to fiat or digital currency, and wherein a principal amount associated with the digital loan transaction is reduced based on a payment associated with the principal amount, wherein the payment is based on fiat currency, digital currency, or payment loan tokens.

4. The computer-implemented method of claim 1, further comprising:

determining, by the I-node, a request from a payee that received payment loan tokens from the borrower or a second payee to convert one or more payment loan tokens to fiat or digital currency;

determining, by the I-node, that a cash-out functionality associated with the payment loan tokens has been disabled; and providing, by the I-node, a notification to the payee or the second payee in response to the request, wherein the notification indicates that the request to convert the one or more payment loan tokens to fiat or digital currency has been denied.

5. The computer-implemented method of claim 4, wherein determining that the cash-out functionality associated with the payment loan tokens has been disabled further comprises:

determining, by the I-node, that the borrower has defaulted on one or more loan payments associated with the digital loan transaction.

6. The computer-implemented method of claim 5, wherein the cash-out functionality can be disabled to one or more of: (i) prevent redemption of the payment loan tokens possessed by the borrower, (ii) prevent redemption of payment loan tokens associated with the digital loan transaction that are in circulation within the digital loan payment network, or (iii) prevent redemption of payment loan tokens associated with the digital loan that have yet to be repaid.

7. The computer-implemented method of claim 1, further comprising:

minting, by the I-node in the blockchain network, second payment loan tokens to conduct digital loan transactions, wherein the second payment loan tokens are loan-specific tokens that are minted specifically for the digital loan transaction, wherein the second payment loan tokens are lender-specific tokens that are minted specifically for a lender that processes the digital loan transaction, wherein the second payment loan tokens are special purpose tokens that are minted specifically for a specified special purpose, wherein the second payment loan tokens are industry-specific tokens that are minted specifically for transactions between entities associated with a particular industry, wherein the second payment loan tokens are geography-specific tokens that are minted specifically for transactions between entities associated with a particular geographic region, wherein the second payment loan tokens are country-specific tokens that are minted specifically for transactions between entities associated with a particular country, wherein the second payment loan tokens are project-specific tokens that are minted specifically for transactions between entities associated with a particular project, or wherein the second payment loan tokens are lender-agnostic tokens that can be used to facilitate transactions between entities regardless of lender.

8. The computer-implemented method of claim 1, further comprising:

generating, by the I-node, a digital loan report based on one or more queries to the blockchain associated with the digital loan payment network, wherein the digital loan report includes transaction information for the digital loan transaction recorded in the blockchain.

9. The computer-implemented method of claim 1, wherein the digital loan payment network comprises a plurality of nodes including at least one minting node associated with a lender that processes the digital loan transaction, at least one processing node associated with the lender, or both.

10. The computer-implemented method of claim 1, further comprising:

determining, by the I-node, that payment loan tokens associated with a digital wallet of a payee are inaccessible;

determining, by the I-node, a payment loan token balance for the digital wallet based on the blockchain associated with the digital loan payment network; and replacing, by the I-node, the payment loan tokens that are inaccessible with replacement payment loan tokens.

11. The computer-implemented method of claim 10, wherein replacing the payment loan tokens that are inaccessible with replacement payment loan tokens further comprises:

restricting, by the I-node, the payment loan tokens that are inaccessible, wherein the restricting comprises:

causing, by the I-node, the digital wallet of the payee to be locked;

causing, by the I-node, a transfer of the payment loan tokens that are inaccessible from the digital wallet to a different digital wallet; and burning, by the I-node, the transferred payment loan tokens from the different digital wallet;

minting, by the I-node, the replacement payment loan tokens; and providing, by the I-node, the replacement payment loan tokens to a replacement digital wallet associated with the payee.

12. The computer-implemented method of claim 1, further comprising:
    determining, by the I-node, a payment transaction between a first payee that received payment loan tokens from the borrower and a second payee;
    generating, by the I-node, a data record that represents the payment transaction, wherein the data record is posted to the blockchain associated with the digital loan payment network.

13. The computer-implemented method of claim 12, further comprising:
    determining, by the I-node, a request from the second payee that received payment loan tokens from the first payee to convert one or more payment loan tokens to fiat or digital currency;
    providing, by the I-node, instructions to a computing system associated with a financial institution to convert the one or more payment loan tokens to fiat or digital currency; and
    causing, by the I-node, the one or more payment loan tokens to be burned.

14. The computer-implemented method of claim 1, wherein a lender can define a smart contract to control usage of the payment loan tokens, wherein the smart contract can programmatically control usage of the payment loan tokens for at least one of: a specified purpose, payee, or project.

15. The computer-implemented method of claim 1, further comprising:
    determining, by the I-node, a payment made by the borrower to the entity based on the payment loan tokens to satisfy at least a portion of a principal amount associated with the digital loan transaction;
    reducing, by the I-node, an amount of fiat currency or digital currency from an escrow account that supports the payment loan tokens associated with the digital loan transaction, wherein the amount of fiat currency or digital currency reduced is based on the payment made by the borrower to the entity; and
    burning, by the I-node, one or more payment loan tokens associated with the payment.

16. The computer-implemented method of claim 1, further comprising:
    determining, by the I-node, a payment made by the borrower to the entity based on fiat currency or digital currency to satisfy at least a portion of a principal amount associated with the digital loan transaction; and
    reducing, by the I-node, an amount of fiat currency or digital currency from an escrow account that supports the payment loan tokens associated with the digital loan transaction, wherein the amount of fiat currency reduced is based on the payment made by the borrower to the entity.

17. The computer-implemented method of claim 1, further comprising:
    determining, by the I-node, a payment made by the borrower to the entity based on the payment loan tokens to satisfy an amount of interest associated with the digital loan transaction;
    burning, by the I-node, the payment loan tokens associated with the payment; and
    generating, by the I-node, a data record that represents the payment made by the borrower to the entity, wherein the data record is posted to the blockchain associated with the blockchain-based digital loan payment network.

18. The computer-implemented method of claim 1, further comprising:
    determining, by the I-node, a payment made by the borrower to the entity based on fiat currency or digital currency to satisfy an amount of interest associated with the digital loan transaction; and
    generating, by the I-node, a data record that represents the payment made by the borrower to the entity, wherein the data record is posted to the blockchain associated with the blockchain-based digital loan payment network.

19. The computer-implemented method of claim 1, wherein the payment loan tokens associated with the digital loan transaction are associated with an obligation to pay interest, wherein the obligation to pay interest is triggered only after one or more of the payment loan tokens are used in a payment to a payee.

20. An I-node for conducting digital loan payment transactions in a digital loan payment network of an entity based on a blockchain network, comprising:
    at least one processor; and
    a memory storing instructions that, when executed by the at least one processor, cause the I-node to perform:
    minting payment loan tokens to conduct digital loan transactions within the digital loan payment network, the I-node being managed by the entity and participating as a node in the blockchain network of the entity, the payment loan tokens being pegged to fiat currency or digital currency, and the payment loan tokens being entity-specific tokens that are circulated in the digital loan payment network of the entity;
    determining a number of payment loan tokens to be provided to a borrower based on a digital loan transaction, wherein the borrower is a network participant associated with the blockchain-based digital loan payment network;
    providing a payment from a digital wallet associated with the I-node to a digital wallet associated with a U-node in the blockchain network, the U-node is associated with the borrower, the U-node including at least one processor and memory, and the payment being based on the number of payment loan tokens to be provided to the borrower based on the digital loan transaction, wherein payees that receive one or more payment loan tokens from the borrower can redeem the one or more payment loan tokens as fiat or digital currency through the I-node;
    generating a data record that represents the digital loan transaction associated with the payment from the I-node to the U-node; and
    providing, by the I-node, the data record to a T-node that participates as a node in the blockchain network, wherein the T-Node is one of a plurality of T-Nodes, each of the plurality of T-Nodes being provisioned by one of a plurality of banks each of which is a member of a common bank consortium, wherein the T-node posts the data record to a blockchain associated with the digital loan payment network hosted by the bank consortium.

21. The I-node of claim 20, wherein the instructions further cause the system to perform:
    determining a request from a payee that received payment loan tokens from the borrower to convert one or more payment loan tokens to fiat or digital currency;

providing instructions to a computing system associated with a financial institution to convert the one or more payment loan tokens to fiat or digital currency; and causing the one or more payment loan tokens to be burned.

22. The I-node of claim 21, wherein fiat currency or digital currency that is pegged to the payment loan tokens is reduced based on the conversion of the one or more payment loan tokens to fiat or digital currency, and wherein a principal amount associated with the digital loan transaction is reduced based on a payment associated with the principal amount, wherein the payment is based on fiat currency, digital currency, or payment loan tokens.

23. The I-node of claim 20, wherein the instructions further cause the system to perform:

determining a request from a payee that received payment loan tokens from the borrower or a second payee to convert one or more payment loan tokens to fiat or digital currency;

determining that a cash-out functionality associated with the payment loan tokens has been disabled; and providing a notification to the payee or the second payee in response to the request, wherein the notification indicates that the request to convert the one or more payment loan tokens to fiat or digital currency has been denied.

24. The I-node of claim 23, wherein determining that the cash-out functionality associated with the payment loan tokens has been disabled further causes the system to perform determining that the borrower has defaulted on one or more loan payments associated with the digital loan transaction.

25. A non-transitory computer-readable storage medium including instructions for conducting digital loan payment transactions in a digital loan payment network of an entity based on a blockchain network, wherein the instructions, when executed by at least one processor of an I-node, cause the I-node to perform:

minting payment loan tokens to conduct digital loan transactions within the digital loan payment network, the I-node being managed by the entity and participating as a node in the blockchain network of the entity, the payment loan tokens being pegged to fiat currency or digital currency, and the payment loan tokens being entity-specific tokens that are circulated in the digital loan payment network of the entity;

determining a number of payment loan tokens to be provided to a borrower based on a digital loan transaction, wherein the borrower is a network participant associated with the blockchain-based digital loan payment network;

providing a payment from a digital wallet associated with the I-node to a digital wallet associated with a U-node in the blockchain network, the U-node is associated with the borrower, the U-node including at least one processor and memory, and the payment being based on the number of payment loan tokens to be provided to the borrower based on the digital loan transaction, wherein payees that receive one or more payment loan tokens from the borrower can redeem the one or more payment loan tokens as fiat or digital currency through the I-node;

generating a data record that represents the digital loan transaction associated with the payment from the I-node to the U-node; and providing, by the I-node, the data record to a T-node that participates as a node in the blockchain network, wherein the T-Node is one of a plurality of T-Nodes, each of the plurality of T-Nodes being provisioned by one of a plurality of banks each of which is a member of a common bank consortium, wherein the T-node posts the data record to a blockchain associated with the digital loan payment network hosted by the bank consortium.

26. The non-transitory computer-readable storage medium of claim 25, wherein the instructions further cause the I-node to perform:

determining a request from a payee that received payment loan tokens from the borrower to convert one or more payment loan tokens to fiat or digital currency;

providing instructions to a computing system associated with a financial institution to convert the one or more payment loan tokens to fiat or digital currency; and causing the one or more payment loan tokens to be burned.

27. The non-transitory computer-readable storage medium of claim 26, wherein fiat currency or digital currency that is pegged to the payment loan tokens is reduced based on the conversion of the one or more payment loan tokens to fiat or digital currency, and wherein a principal amount associated with the digital loan transaction is reduced based on a payment associated with the principal amount, wherein the payment is based on fiat currency, digital currency, or payment loan tokens.

28. The non-transitory computer-readable storage medium of claim 25, wherein the instructions further cause the I-node to perform:

determining a request from a payee that received payment loan tokens from the borrower or a second payee to convert one or more payment loan tokens to fiat or digital currency;

determining that a cash-out functionality associated with the payment loan tokens has been disabled; and providing a notification to the payee or the second payee in response to the request, wherein the notification indicates that the request to convert the one or more payment loan tokens to fiat or digital currency has been denied.

29. The non-transitory computer-readable storage medium of claim 28, wherein determining that the cash-out functionality associated with the payment loan tokens has been disabled further causes the I-node to perform:

determining that the borrower has defaulted on one or more loan payments associated with the digital loan transaction.

* * * * *